US 6,708,279 B1

(12) United States Patent
Takenaka

(10) Patent No.: US 6,708,279 B1
(45) Date of Patent: *Mar. 16, 2004

(54) TEMPERATURE SENSOR CALIBRATION DURING POWERSAVE MODE BY EXECUTING A CONTROL PROGRAM IN A CONTROL UNIT AND LOWERING CLOCK FREQUENCY AFTER OTHER DEVICES ARE POWERED OFF

(75) Inventor: Shigeo Takenaka, Kamakura (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/426,131

(22) Filed: Oct. 25, 1999

(30) Foreign Application Priority Data

Oct. 27, 1998 (JP) ............................. 10-306064
Nov. 12, 1998 (JP) ............................. 10-322656

(51) Int. Cl.[7] .................................. G06F 1/32
(52) U.S. Cl. .................. 713/324; 713/322; 347/17; 702/99
(58) Field of Search ................ 347/14, 17; 713/322, 713/324; 358/1.9; 702/99

(56) References Cited

U.S. PATENT DOCUMENTS

| 4,223,324 A | | 9/1980 | Yamamori et al. ...... 346/140 R |
| 5,457,516 A | | 10/1995 | Kim ........................... 355/208 |
| 5,530,879 A | * | 6/1996 | Crump et al. ................ 713/323 |
| 5,659,763 A | * | 8/1997 | Ohashi ........................ 713/310 |
| 5,745,132 A | * | 4/1998 | Hirabayashi et al. ......... 347/14 |
| 5,831,593 A | * | 11/1998 | Rutledge .................... 345/156 |

FOREIGN PATENT DOCUMENTS

| EP | 0 526 189 | 2/1993 |
| EP | 0 549 369 | 6/1993 |
| JP | 62-221716 | 9/1987 |
| JP | 63026716 | 2/1988 |
| JP | 64-21617 | 1/1989 |
| JP | 02178818 | 7/1990 |
| JP | 05258087 | 10/1993 |
| JP | 6-175754 A | 6/1994 |
| JP | 06-289669 | 10/1994 |
| JP | 07219688 | 8/1995 |
| JP | 08-101609 | 4/1996 |
| JP | 10097340 | 4/1998 |
| JP | 10-149062 | 6/1998 |

OTHER PUBLICATIONS

Woods et al., "IEEE–P1451.2 Smart Transducer Interface Module", Proc. of Sensors Conf., Philadelphia, PA, Oct. 22–24, 1996.*

IBM Technical Disclosure Bulletin, vol. 32 No. 8B p. 373, Jan. 1990, "Dynamic Power Management by Clock Speed Variation".*

* cited by examiner

Primary Examiner—Thomas Lee
Assistant Examiner—Albert Wang
(74) Attorney, Agent, or Firm—Fitzpatrick, Cella, Harper & Scinto

(57) ABSTRACT

An electronic apparatus comprising a control unit including at least a CPU, a RAM, and an I/O port; and a ROM for storing a control program executed by the CPU, further includes a power supply circuit for supplying power to each device thereof and a switching circuit for turning on/off the power supplied from the power supply circuit to the ROM, and transfers the control program stored in the ROM to the RAM according to power-off direction, lets a switching circuit turn off the power supply to devices other than the control unit after the transfer, and then lets the CPU execute the control program stored in the RAM while the power supply to the control unit is maintained, thereby executing processings for, for example, calibrating a head temperature sensor, lowering the clock frequency of the control unit or the like.

30 Claims, 18 Drawing Sheets

TEMPERATURE SENSOR CALIBRATION DURING POWERSAVE MODE BY EXECUTING A CONTROL PROGRAM IN A CONTROL UNIT AND LOWERING CLOCK FREQUENCY AFTER OTHER DEVICES ARE POWERED OFF

BACKGROUND OF THE INVENTION

The present invention relates to an electronic apparatus comprising a plurality of devices and a method for controlling the supply of power to the electronic apparatus, as well as a recording apparatus and a method for controlling the supply of power to the recording apparatus.

Conventionally, there have been some methods for supplying power to an electronic apparatus. In one of the methods, a power switch is used to shut off the power to the input of the power supply circuit of the apparatus, thereby shutting off the supply of the power to the whole apparatus. In another method, even when the power switch is turned off, supply of the power is kept to part of the apparatus.

In detail, in some of such electronic apparatuses as TV sets, computer devices or the like, their circuits are partially kept applied with power even when the power switch is off as long as its AC plug is connected to an AC outlet. In such an apparatus, for example, a remote controlling device which uses an infrared beam, or the like, can be used to turn on/off the power supply thereof.

Hereunder, a configuration of a power supply circuit for a conventional electronic apparatus will be described with reference to FIGS. 15 through 22.

In FIGS. 15 through 22, reference number 101 denotes an AC plug, reference number 102 denotes a main power switch, reference number 103 denotes a power supply circuit, reference numbers 104 and 105 denote control circuits dedicated to the operation of the apparatus. Reference number 106 denotes a sub-power switch, reference number 107 denotes an operation panel, and reference number 108 denotes an infrared beam remote controlling device. Reference number 109 denotes an infrared beam signal input device and reference number 110 denotes a battery.

FIG. 15 is a block diagram for a configuration of such an electronic apparatus which has no power switch.

The AC plug 101 is connected to an AC outlet, thereby supplying a commercial power to the power supply circuit 103. The power is then supplied from the power supply circuit 103 to the control circuit 104 dedicated to the apparatus, which is thus enabled for an operation. The apparatus power is turned on/off by connecting/disconnecting the AC plug 101 to/from the AC outlet. Although such power on/off controlling is troublesome, the configuration can save both space and cost of the apparatus since it includes no power switch.

FIG. 16 is a block diagram for another configuration of the apparatus shown in FIG. 15, in which a power switch 102 is added newly.

The power switch 102 is disposed between the AC plug 101 and the power supply circuit 103, and thereby the supply of the power to the power supply circuit 103 can be shut off. In this case, the power switch 102 is turned on to supply the power to the whole apparatus. Compared with the configuration shown in FIG. 15, this configuration makes it easier to turn on/off the power to the apparatus.

FIG. 17 is further another block diagram for the power supply configuration of the electronic apparatus shown in FIG. 16, in which a sub-power switch 106 is also added in addition to the main power switch 102.

In the power supply configuration shown in FIG. 17, the control circuit 104 shown in FIG. 16 is divided into two control circuits 104 and 105. In one control circuit 104, no power switch is disposed between the control circuit 104 and the power supply circuit 103 and the control circuit 104 is kept supplied with a power from the power supply circuit 103. In the other control circuit 105, a sub-power switch 106 is disposed between the control circuit 105 and the power supply circuit 103, so that the power to the control circuit 105 can be shut off. Such a type of the control circuit 104 to which a power is kept supplied is materialized as, for example, a preheating circuit or the like. In such a preheating circuit 104, the main power switch 102 is turned on to actuate the control circuit 104, thereby starting preheating. After that, the sub-power switch 106 is turned on to supply the power to the whole apparatus so as to start the operation quickly.

FIG. 18 is another block diagram for the power supply configuration shown in FIG. 17. Although no power supply controlling is made between the two control circuits 104 and 105 in FIG. 17, the supply of the power from one control circuit 104 shown in FIG. 20 to the other control circuit 105 is controlled in this case. A power is kept supplied to the control circuit 104 shown in FIG. 20.

In this configuration, the control circuit 104 to which a power is supplied non stop is provided with a control signal input/output circuit used to decide whether to shut off the power to the other control circuit 105. The control signal input/output circuit is connected to the operation switch 106 provided on the operation panel 107. An operator turns on/off this operation switch 106 to supply the power or stop the supply of the power to the other control circuit 105. Consequently, the power supply wiring can be made more freely, as well as whether to provide a power switch to the object apparatus can be selected more freely. This is an advantage of this power supply configuration.

FIG. 19 is a block diagram for another power supply configuration in which the switch 106 of the control signal input circuit shown in FIG. 18 is replaced with an infrared beam signal input circuit.

In this case, an infrared beam signal is output from the infrared beam remote controlling device 108 provided outside the electronic apparatus, thereby transmitting a power on/off signal, which is then received at the infrared beam input circuit 109 provided to the electronic apparatus body and used to start/stop the supply of the power to the other control circuit 105. This configuration is realized by controlling the supply of the power shown in FIG. 18 with the input of a signal.

FIG. 20 is a block diagram for another power supply configuration shown in FIG. 18, from which the main power switch 102 is removed.

An object of this power supply configuration is to save both cost and space of the object apparatus, as well as to keep operating one control circuit 104.

FIG. 21 is another block diagram for the power supply configuration shown in FIG. 19. This power supply configuration shown in FIG. 21 is not provided with any power switch. It stops the operation of the other control circuit 105 so as to save the power consumption by transmitting a stop signal to the control circuit 105 from the control circuit 104 to which a power is kept supplied.

In this configuration, the operation of the control circuit 105 is stopped with the use of a stop signal transmitted, for example, after the operation of the apparatus is ended.

FIG. 22 is another block diagram of the power supply configuration shown in FIG. 16. In this power supply configuration shown in FIG. 22, the AC input circuit shown in FIG. 16 is replaced with a battery.

In this case, a power switch 102 is disposed between the battery 110 and the power supply circuit 103. The power switch 102 is turned off when the apparatus is not used, thereby saving the power consumption of the battery 110. In the same way, the AC input circuit may be replaced with a battery even in the power supply configurations shown in FIGS. 17 through 21.

As described above, there have been proposed various power supply configurations so far. In the conventional electronic apparatus, however, only part of the circuit in the electronic apparatus is operated to save the power consumption of the object apparatus.

If a power is kept supplied to an apparatus and part of the apparatus while the AC plug is just connected to an AC outlet such way, the power consumption becomes a problem. Concretely, almost all persons will not disconnect the AC plug from the AC outlet each time the electronic apparatus such as a TV set, a video tape recorder, a computer device or the like is not used. It most cases, those units will be kept connected to their AC outlets. In recent years, however, a marked tendency is seen to reduce unnecessary power consumptions of those electronic devices with the increasing sensitivity of environmental and ecological problems.

SUMMARY OF THE INVENTION

Under such circumstances, therefore, it is an object of the present invention to provide an electronic apparatus and a recording apparatus which can save more power and a method for controlling the supply of the power to both of them when in the standby state.

It is another object of the present invention to provide an electronic apparatus for which the supply of power is controlled only by supplying the power to a control unit in the standby state with the use of a control program transferred to a RAM in the control unit from a memory to which the power supply can be shut off so as to be executed in the standby state, and a method for controlling the supply of the power to the apparatus.

It is further another object of the present invention to provide an electronic apparatus which can save power consumption and use the standby time effectively by executing a processing which should be executed in the steady-state in the standby state and a method for controlling the supply of the power to the apparatus.

It is further another object of the present invention to provide an electronic apparatus which can save more power consumption in the standby state by lowering the frequency of a clock signal supplied to a control unit in the standby state, and a method for controlling the supply of power to the apparatus.

To attain the above objects, the electronic apparatus of the present invention comprises control unit provided with at least a CPU, a RAM, and an I/O port, and a memory for storing a control program executed by the CPU. And, the apparatus further comprises;

a power supply unit for supplying power to each device therein;

a switching circuit for turning on/off the power supplied to the devices other than the control unit from the power supply unit;

transferring means for transferring the control program stored in the memory to the RAM according to a power-off direction; and power-off controlling means for controlling the switching circuit so as to turn off the power supply to devices other than the control unit after the control program is transferred to the RAM by the transferring means;

wherein the CPU executes the control program stored in the RAM while the power supply to the control unit is maintained after the power-off controlling means turns off the power supply to devices other than the control unit.

Furthermore, to attain the above objects, the method for controlling the power supply to the electronic apparatus of the present invention comprises the following steps. Concretely, the power supply controlling method, which is used for the electronic apparatus comprising a control unit provided with at least a CPU, a RAM, I/O ports, and a memory for storing a control program executed by the CPU, further comprises;

a transferring step of transferring the control program stored in the memory to the RAM according to a power-off direction;

a step of turning off the power supplied to devices other than the control unit from a power supply unit for supplying power to each device in the electronic apparatus after the control program is transferred to the RAM by the transferring step; and a step of executing the control program stored in the RAM with the CPU while the power supply to the control unit is maintained after the power supply except for the control unit is turned off.

Furthermore, to attain the above objects, the electronic apparatus of the present invention comprises a plurality of devices including;

controlling means for controlling the operations of a plurality of the devices;

supplying means for supplying a clock for operating a plurality of the devices;

directing means for directing the supplying means to start its operation; and power supply controlling means for controlling power supply to devices other than a device required for controlling the controlling means.

To attain the above objects, the method for controlling power supply to the electronic apparatus of the present invention comprises a plurality of steps including;

a supplying step of supplying a clock for operating a plurality of the devices;

a plurality of directing steps for directing the supplying process to start its operation respectively; and a power supply controlling step of controlling power supply to devices except for a device required by the control unit for controlling the operations of a plurality of the devices.

Furthermore, to attain the above objects, the recording apparatus of the present invention, which is used for recording images according to recorded data, comprises;

controlling means for controlling the operation of each of a plurality of devices thereof;

supplying means for supplying a clock for operating a plurality of the devices;

a plurality of directing means for directing the supplying means to start its operation respectively;

power supply controlling means for controlling the power supply to devices except for a device necessary for controlling the controlling means; and recording means for recording images according to the recorded data.

Furthermore, to attain the above objects, the method for controlling power supply to the recording apparatus of the present invention, which reduces the power consumption of the recording apparatus for recording images according to recorded data, comprises;

a supplying step of supplying a clock for operating a plurality of the devices;

a plurality of directing steps for directing the supplying step to start its operation respectively;

a power supply controlling step of controlling the power supply to devices except for a device required by the control unit for controlling the operations of a plurality of the devices of the recording apparatus; and a recording process for recording images according to the recorded data.

Further objects, features and advantages of the present invention will become apparent form the following detailed description of embodiments of the present invention with reference to the accompanying drawings.

DESCRIPTION OF THE PREFERRED EMBODIMENTS

Hereunder, some preferred embodiments of the present invention will be described in detail with reference to the accompanying drawings.

(First Embodiment)

Figure 1:
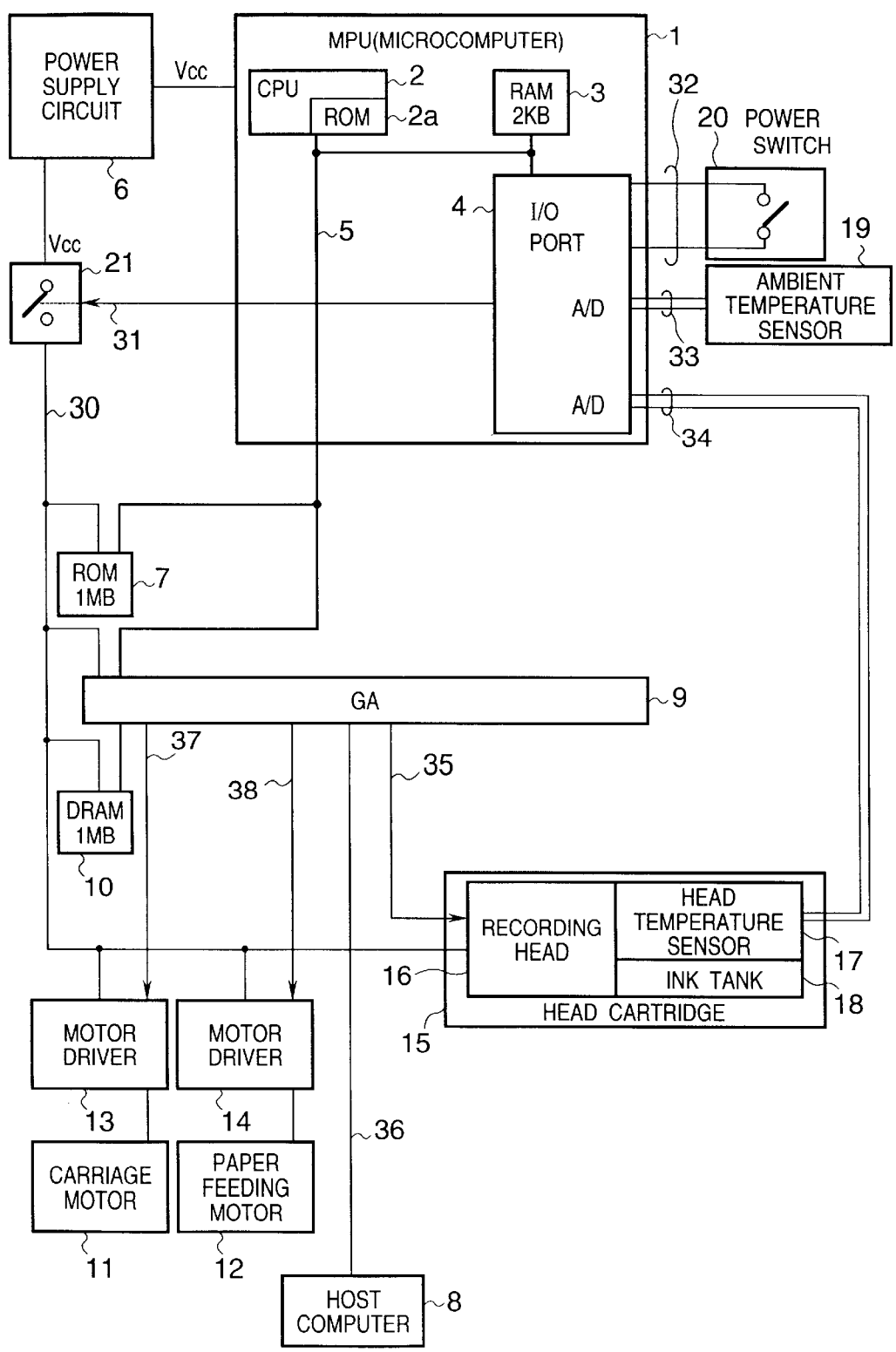
FIG. 1 is a block diagram of an electronic apparatus in the first embodiment of the present invention.

FIG. 1 is a block diagram of a configuration of an electronic apparatus in the first embodiment of the present invention.

In FIG. 1, the electronic apparatus means an ink jet printer.

In FIG. 1, reference number 1 denotes an MPU (control unit), which is, for example, a microprocessor. The MPU has a CPU 2, a ROM 2a, a RAM 3, and an I/O port 4, etc. in itself. The I/O port 4 has an A/D conversion function. The CPU 2, the RAM 3, and the I/O port 4 are connected to each another via a bus 5.

6 is a power supply circuit of the printer. This power supply circuit generates a DC voltage from an external AC power supply and the DC voltage is supplied to each device of the printer. 7 is a ROM for storing various programs including the one for controlling the printer in the first embodiment. 8 is a host computer, which is connected to a GA (gate array) 9 of this ink jet printer via an interface line 36. The host computer 8 supplies recording data to this printer. 9 is a GA (gate array) used as an interface with the host computer 8 and as an output terminal of a motor driving signal to the motor drivers 13 and 14, and further as an output terminal of recording data to a head cartridge 15.

10 is a DRAM for saving recording data received from the host computer 8 via the GA 9 and the result of each image processing executed by an image processing circuit provided in the GA 9. The image processing executed in this GA 9 is controlled by the CPU 2 according to the control program stored in the ROM 7.

11 is a carriage motor whose rotation drives the head cartridge 15 mounted in the carriage 11 for the main scanning. 12 is a paper feeding motor which feeds such a recording medium as printing paper. 13 and 14 are motor drivers connected to the carriage motor 11 and the paper feeding motor 12 corresponding to them respectively. According to a command from the MPU 1, the motor drivers 13 and 14 rotate the carriage motor 11 and the paper feeding motor 12 respectively. 37 and 38 are lines of motor control signals output from the GA 9 to the motor drivers 13 and 14.

15 is a head cartridge provided with a recording head 16, a head temperature sensor 17 for measuring the temperature of this recording head 16, and an ink tank 18. The GA 9 reads print data saved in the DRAM 10 according to the command from the CPU 2 and outputs the data to the recording head 16 via the signal line 35 so as to be printed out. The recording head 16 is an ink jet type head composed so as to power a heat generating resistor provided in the nozzle of the recording head 16, thereby heating an ink and jetting the ink as bubbles generated by the heat. Because the recording head 16 is controlled by heat such way, a head temperature sensor 17 is used to monitor the temperature of the recording head 16. And, according to the result of the temperature measurement, the MPU 1 controls recording. In other words, the temperature of the recording head 16 detected by the head temperature sensor 17 is entered to the I/O port 4 as an analog signal via the signal line 34, then converted to a digital signal there and fetched into the CPU 2.

19 is an ambient temperature sensor used to measure the ambient temperature of the printer. The measured temperature signal is then entered to the I/O port 4 via the signal line 33 and converted to a digital signal there, then fetched into the CPU 2.

20 is a power switch connected to the I/O port 4 via a pair of signal lines 32. When the switching circuit is closed, the power switch 20 detects that the switch 20 is pressed. The CPU 2 controls the power switch 20 so that each time the power switch 20 is pressed, the power supply of the printer is turned on/off alternately.

21 is a switch used to control power on/off to each device of the printer from the power supply circuit 6. Concretely, this switch 21 is turned on/off by a switch signal 31 output from the CPU 2 via the I/O port 4. The power line 30 from this switch 21 is connected to the power input terminal of each of the ROM 7, the GA 9, the DRAM 10, the carriage motor 11, the paper feeding motor 12, the motor drivers 13 and 14, and the head cartridge 15. The switch 21 can thus supply/stop the supply of a power to each of those elements and devices of the printer. As shown in FIG. 1, each of the head temperature sensor 17 and the ambient temperature sensor 19 has, for example, a thermistor, etc. and connected to the I/O port 4 of the MPU 1 via two signal lines (voltage supply and feedback lines), so that it is kept supplied with a power from the power supply circuit 6 via the I/O port 4 regardless of the on/off status of the switch 21.

In the case of the printer in the first embodiment, the output of the head temperature sensor 17 must be calibrated periodically or continuously to keep the accuracy of the measurement for a long time. This calibration of the head temperature is done according to the result of comparison between the output of the head temperature sensor 17 and the output of the ambient temperature sensor 19. The calibration should be avoided during recording or just after a recording operation, since the temperature of the head 16 is high. Concretely, the calibration of the head temperature should be done at the steady state of the temperature, not at a transition state. This is why such the calibration should be done while the printer is in the standby state. On the other hand, it is also desired that the power consumption of the printer is suppressed as low as possible in the standby state. In this first embodiment, therefore, when the printer is in the standby state, the power is supplied only to the minimum number of elements (devices, etc.) necessary for the calibration of the head temperature and the power is shut off for other elements.

More concretely, in the first embodiment, if the power switch 20 is pressed to turn off the power to the printer, the power supply is kept only to the MPU 1, the head temperature sensor 17, and the ambient temperature sensor 19. The printer is then set in the standby state. After that, the head temperature is calibrated in this standby state, and the power switch 20 is monitored so that the whole printer is powered again when the power switch 20 is pressed on.

Figure 2:
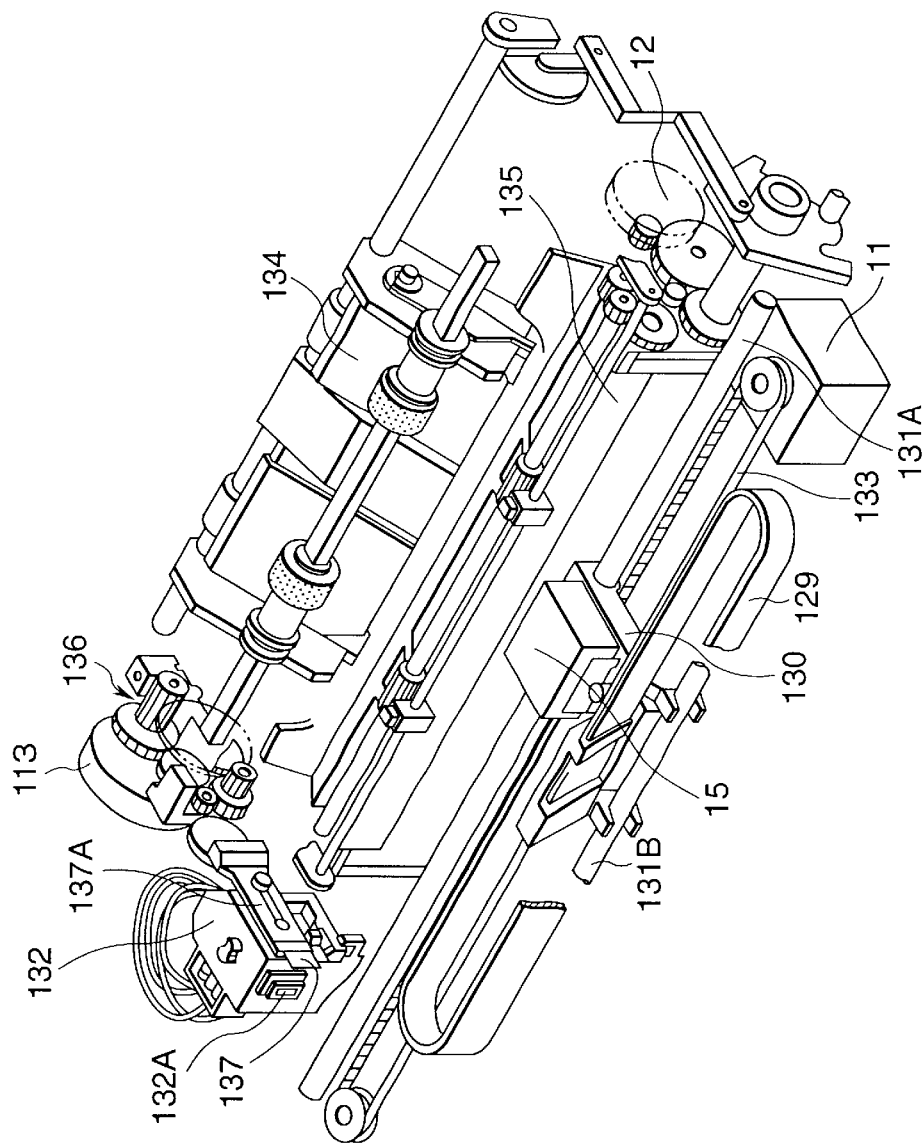
FIG. 2 is a schematic view of the recording block of an ink jet printer in the first embodiment of the present invention.

FIG. 2 is a schematic view of the mechanism of the ink jet printer in the first embodiment. In FIG. 2, the same reference numbers are used for the same items as those shown in FIG. 1.

In FIG. 2, the carriage 130 is linked to part of the belt 133 which transmits the rotating force of the carriage motor 11 and engaged slidably with two guide shafts 131A and 131B disposed in parallel to each other, thereby enabling the head cartridge 15 provided with the recording head 16 (ink jet head) to be moved at the full width of a member eligible for recording. The relative movement of the carriage 130 and the recording eligible member is thus controlled by an input of a predetermined recording signal, thereby recording a predetermined image on the recording face of the printing paper fed to the platen 135 from the paper feeder 134. The printing paper is fed by transmitting the rotation of the paper feeding motor 12 to the platen roller, etc.

Reference number 136 denotes a head recovery unit disposed at one end of the moving path of the head cartridge 15, for example, at a position facing the home position of the head cartridge 15. The head recovery unit 136 is driven by the motor 113 via an motor mechanism 132, so that the recording head 16 mounted at the head cartridge 15 is capped. When the recording head 16 is capped by the cap 132A of this head recovery unit 136, the ink is sucked by a proper sucking means provided in the head recovery unit 136 or transferred by a proper pressing means provided in the ink supply path to the recording head 16 in a pressed manner. The ink in the nozzle is thus jet out forcibly, thereby carrying out an ink jet recovery processing such as removal of the deteriorated ink (becoming more sticky) from the ink path. When the recording is ended, the recording head 16 is capped so as to be protected from damages.

137 is a blade used as a wiping member formed of silicon rubber and disposed at one side of the head recovery unit 136. This blade 137 is held at a blade holding member 137A in the form of a cantilever. Just like the head recovery unit 136, the blade 137 is driven by the motor 113 and the motor mechanism 132 so that it is engaged with the ink discharging face of the recording head 16. Consequently, at an appropriate time in a recording operation of the recording head or at a time when the discharging is recovered by using the head recovery unit 136, the blade 137 is protruded in the moving path of the recording head 16 so as to wipe dropwise condensation, moisture, or dust or the like off the ink discharging face of the recording head 16 while the recording head 16 is moving.

Next, processings performed in the ink jet printer in the first embodiment will be described with reference to the flow chart shown in FIG. 3. A program for executing the processings in steps S1 and S2 is stored in the ROM 2*a* of the CPU 2 and other programs for executing processings in other steps are stored in the ROM 7.

When the AC plug connected to the power supply circuit 6 is connected to a commercial AC outlet and the AC_in signal is detected, the CPU is reset (power on reset) due to the start of this AC power supply. The AC_in indicates a start of AC supply to the power supply circuit 6. In step Si, therefore, the system control jumps (JMP) to the reset vector. Consequently, a program stored in the ROM 2*a* is executed, thereby in step S2, the CPU 2 sets the I/O port 4 and initializes the necessary units including the RAM 3. Then, the system control goes to step S3 to check if the power switch 20 is pressed or not. If the switch 20 is pressed, the system control goes to step S4, then outputs a switching signal 3 to close the switch 21. Consequently, the power supply is started for the ROM 7, the GA 9, the DRAM 10, the motors, the recording head 15, etc. After that, the system control goes to step S5 to wait for the start-up of each device in the printer, then goes to step S6. The system control is then passed to the control program stored in the ROM 7. Consequently, the system control goes to step S7, where recording data is received from the host computer 8, the motors are controlled, and the received data is recorded under the control of the main program stored in the ROM 7.

If the power switch 20 is pressed while this main program is executed in step S8, the system control goes to step S9 a and transfers a program to be executed while the printer stands by to the RAM 3 of the MPU 1 so as to be stored there. The system control then goes to step S10, then the control is passed to the program copied in this RAM 3. Next, the system control goes to step S11, where the program copied in the RAM 3 is executed, thereby the power supply to each device in the printer is stopped, and the head temperature sensor 17 is calibrated.

Next, the processing to be executed in this standby state in step S11 will be described.

At first, a switch signal 31 is output to open the switch 21 in step S111, then the power supply to the power line 30 is stopped. The power supply to all the devices in the printer except for the MPU 1 is thus stopped. The system control then goes to step S112, where the head temperature sensor 17 is calibrated according to the temperature detected by the head temperature sensor 17 and the temperature detected by the ambient temperature sensor 19. Note, it is preferable that the calibration is performed by using the temperature detected by the ambient temperature sensor 19 after a predetermined time period from the completion of the printing operation in order to calibrate the head temperature sensor 17 accurately. For this reason, by performing the temperature detection immedeately after compliting the printing operation, a temperature of variation caused by the printing operation can be detected. The system control then goes to step S113, where it is decided if the power switch 20 is pressed or not. If the switch 20 is not pressed, the system control returns to step S112, where the head temperature sensor 17 is calibrated. If the switch 20 is pressed, the system control goes to step S114, where the switch 21 is closed due to the switch signal 31. Consequently, the power supply to the power line 30 is restarted. Although the power is supplied to each device in the printer again such way, some (elements) of the devices are still disabled for their operations. The system control thus waits until all those devices come to get ready to start up in step S115. The system control then goes to step S116, where the control is passed to the program stored in the ROM 7. The system control thus goes to step S7, where it is decided if the MPU 1 has executed the main program of the printer in the first embodiment, thereby the power switch 20 is pressed in step S8. On the other hand, the system control enables processings including interfacing with the host computer 8 and controlling of the recording.

As described above, according to the first embodiment, therefore, it is possible to calibrate the head temperature sensor while the power consumption is suppressed when the printer stands by.

(Second Embodiment)

Although the present invention applies to a printer provided with only one recording head 16 in the first embodiment, the present invention can also apply to a printer provided with a plurality of recording heads, for example, a multi-color printer. Hereunder, such a multi-color printer will be described as the second embodiment of the present invention.

Figure 4:
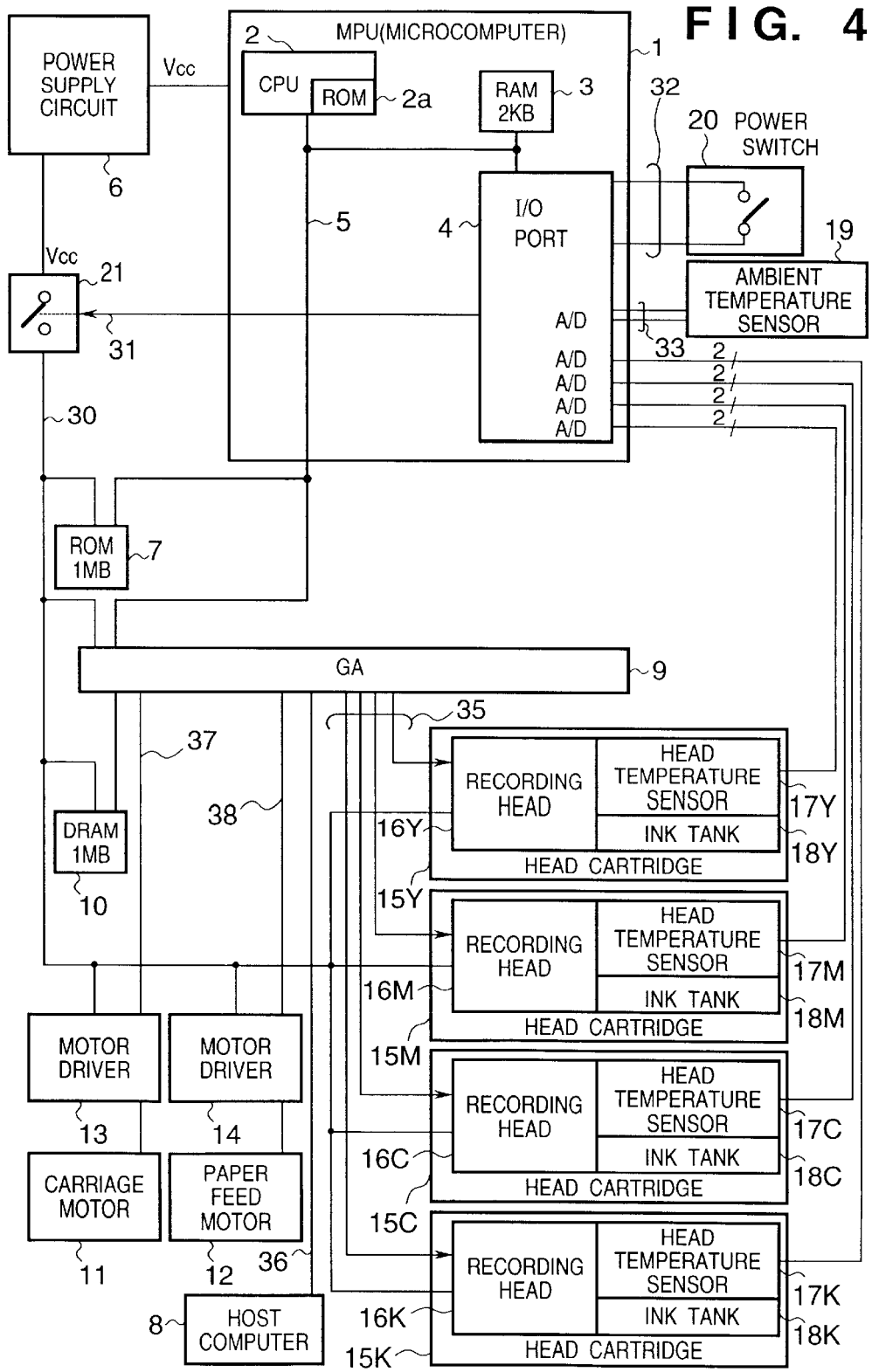
FIG. 4 is a block diagram of an electronic apparatus in the second embodiment of the present invention.

FIG. 4 is a block diagram of an electronic apparatus in the second embodiment of the present invention. The configuration in FIG. 2 is different from that shown in FIG. 1 only in that the recording head 16 is replaced with a plurality of recording heads (16Y for yellow, 16M for magenta, 16C for cyan, and 16K for black).

The head temperature of each of those recording heads is detected by its corresponding head temperature sensor (17Y, 17M, 17C, 17K) provided for each head. The signal of each head temperature sensor is entered to the CPU 2 via the I/O port 4. Consequently, just like in the first embodiment described above, the CPU 2 obtains the signals from the head temperature sensors 17Y, 17M, 17C, and 17K of the four recording heads 16Y to 16K sequentially via the I/O port 4 and compares each of those signals with an ambient temperature signal obtained from the ambient temperature sensor 19, thereby calibrating each head temperature sensor.

Figure 3:
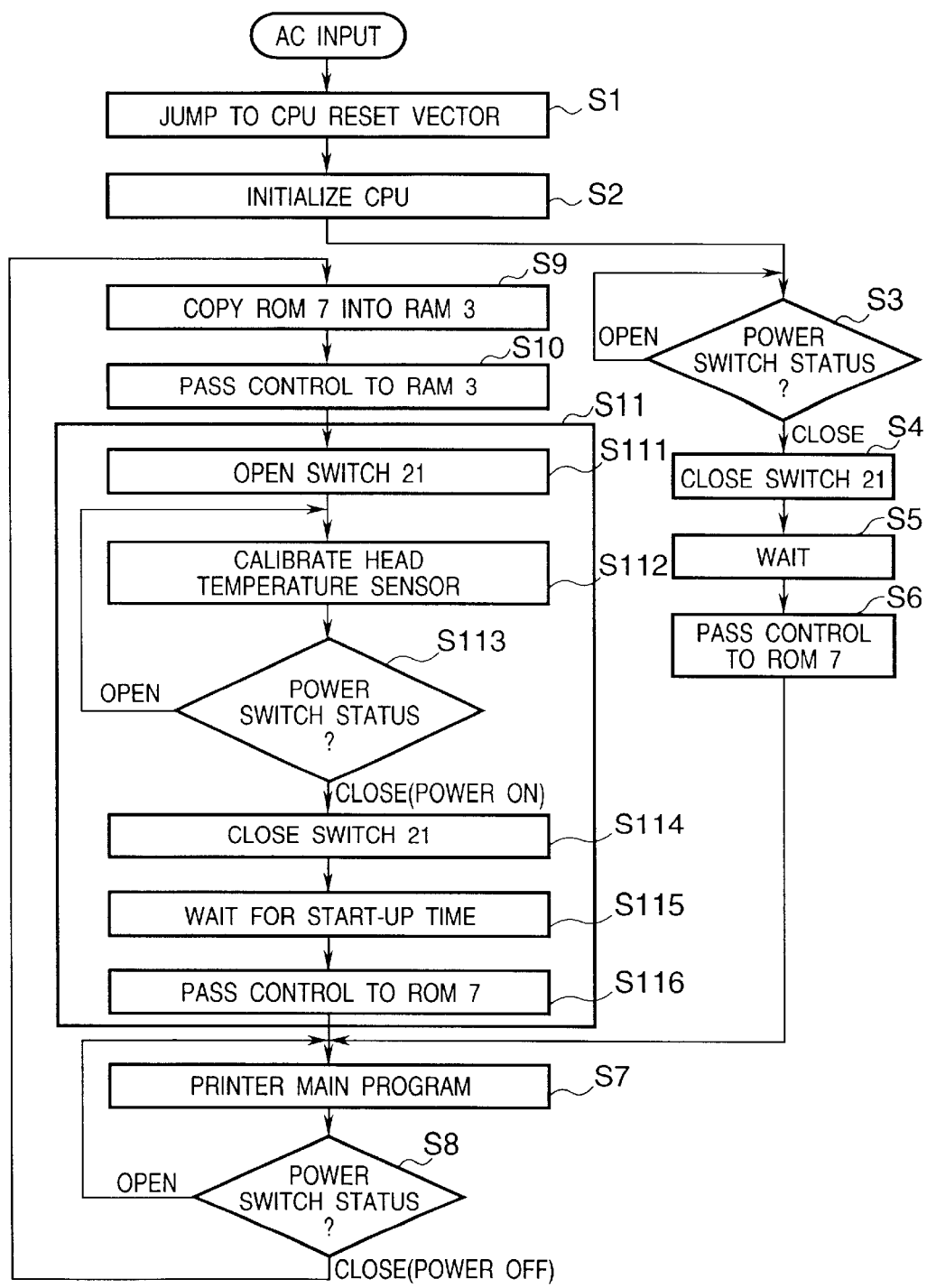
FIG. 3 is a flow chart for a processing sequence executed in the ink jet printer in the first embodiment of the present invention.

In this case, the CPU 2 receives signals from the head temperature sensors of the four recording heads in step S112 shown in FIG. 3 and compares each of those signals with the signal from the ambient temperature sensor 19, thereby calibrating the output of each head temperature sensor.

As described above, according to the second embodiment, therefore, it is also possible to obtain the same effect as that of the first embodiment in a printer provided with a plurality of recording heads.

(Third Embodiment)

Figure 5:
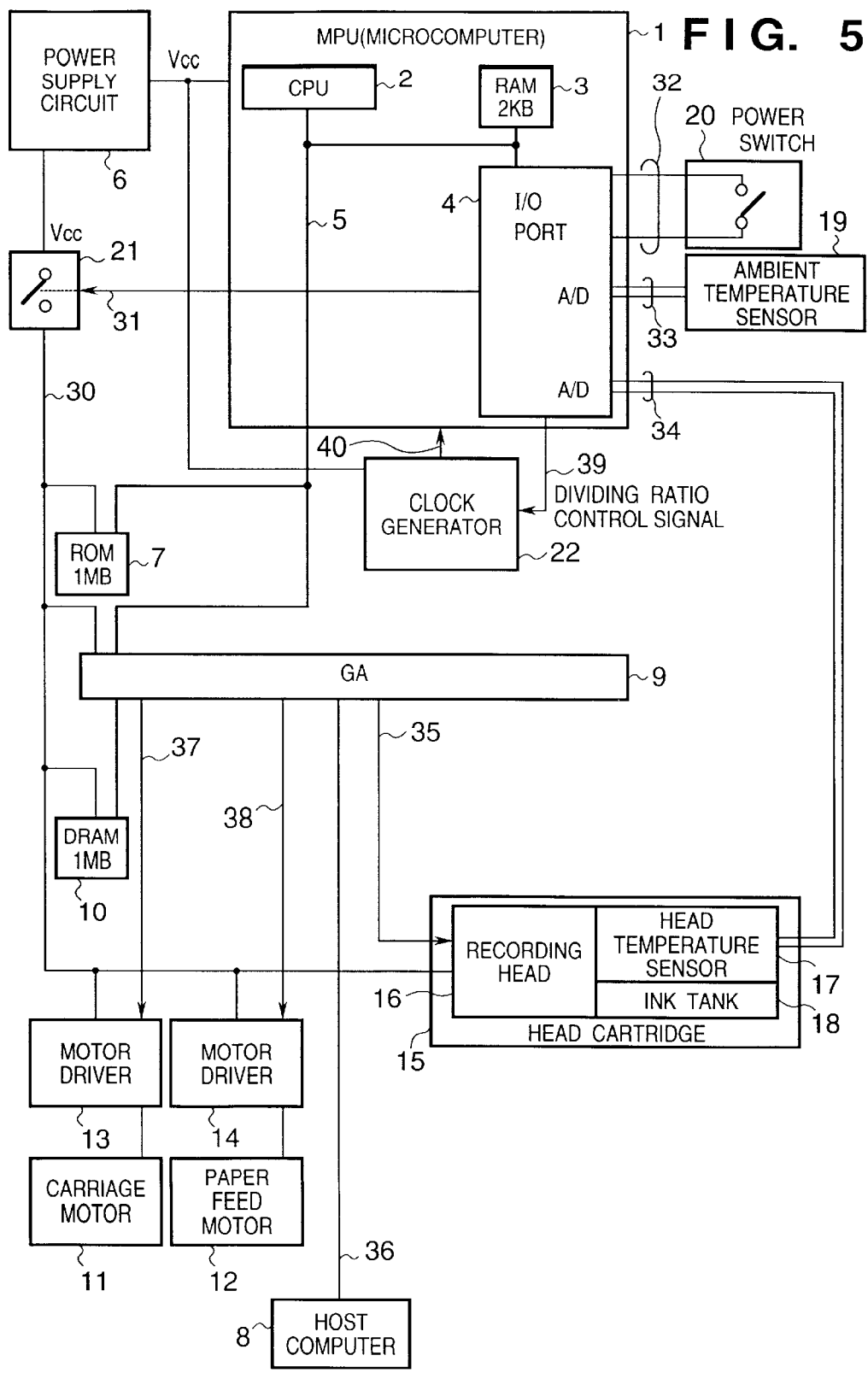
FIG. 5 is a block diagram of an electronic apparatus in the third embodiment of the present invention.

FIG. 5 is a block diagram of an electronic apparatus in the third embodiment of the present invention. In this apparatus, a clock generator 22 is added newly to the configuration shown in FIG. 1.

In the third embodiment, if the ink jet printer enters the standby state (idle state), the frequency of the clock signal 40 (also reffered to as "clock") supplied to the MPU 1 from the clock generator is lowered, thereby the power consumption of the MPU 1 in the standby state is reduced. This clock generator 22 can output a clock signal 40 at a dividing ratio determined according to the dividing ratio control signal 39 received via the I/O port 4. For example, the 10 MHz clock signal 40 entered to the MPU 1 is usually divided to ½ according to the dividing ratio control signal 39, thereby lowering the clock signal frequency to 5 MHz, then supplied to the MPU 1. Consequently, the operation of the MPU 1 is slowed down while the printer stands by, so that the power consumption of the MPU 1 is suppressed.

Figure 6:
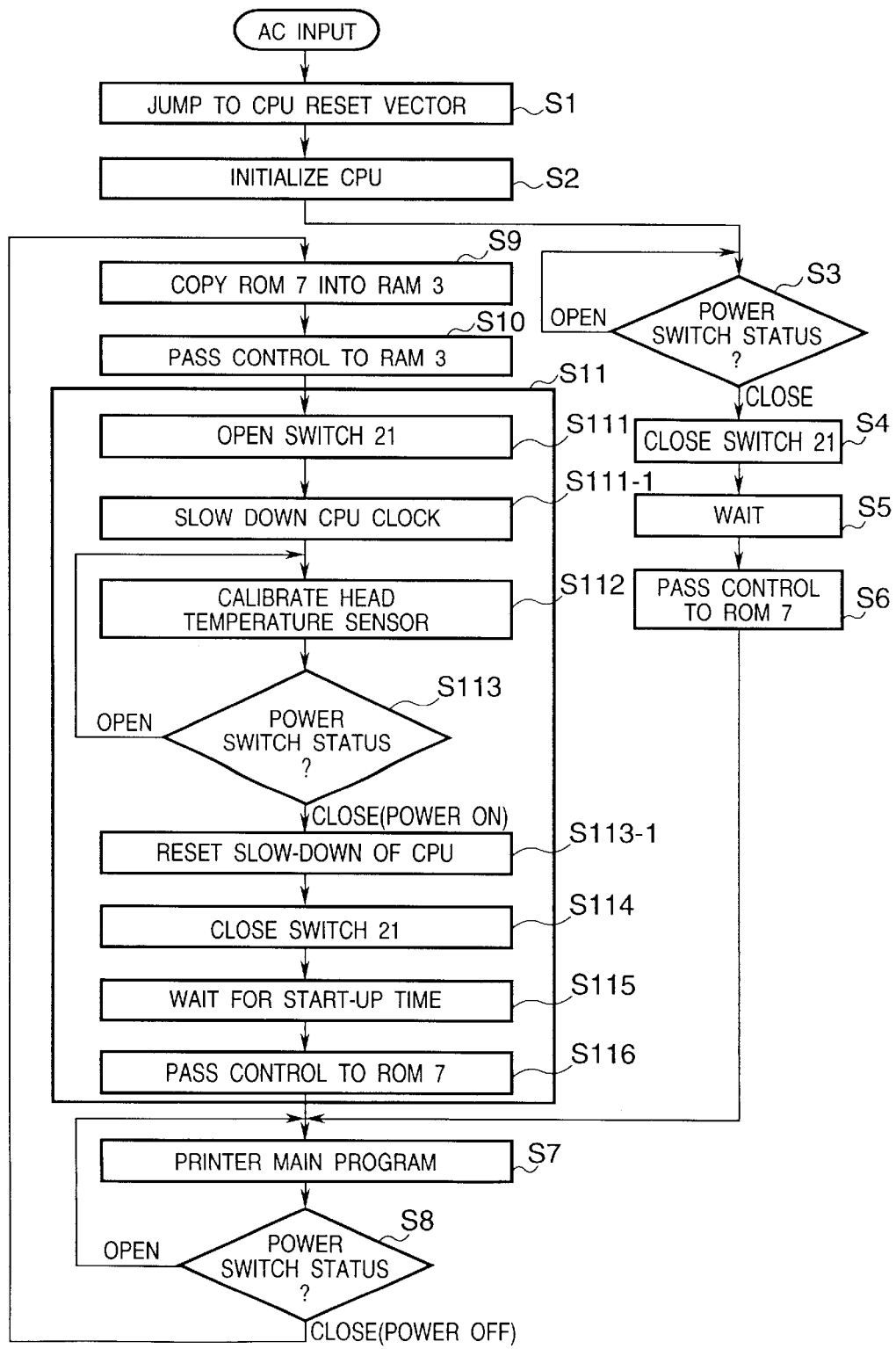
FIG. 6 is a flow chart for a processing sequence executed in the ink jet printer in the third embodiment of the present invention.

FIG. 6 is a flow chart for a processing sequence executed in the ink jet printer in the third embodiment of the present invention. In FIG. 6, the same reference numbers are used for the same processing steps as those shown in FIG. 3, avoiding redundant description.

In FIG. 6, if the power switch 20 is pressed to turn off the power supply in step S8, the system control goes to step S9, where the control program stored in the ROM 7 is copied into the RAM 3. The control is then passed to the program stored in the RAM 3 in step S10. In step S111, the switch 21 is opened. And, the dividing ratio control signal 39 is output in step S111-1, thereby the dividing ratio is set to, for example, _½_ in the clock generator 22 and the frequency of the clock signal entered to the MPU 1 is lowered to 5 MHz.

In step S113, if the power switch 20 is pressed to turn on the power supply, the system control goes to step S113-1, where the dividing ratio control signal 39 is output, then the dividing ratio in the clock generator 22 is restored to _1_ so as to raise the frequency of the clock signal 40 to the original 10 MHz.

As described above, according to the third embodiment, therefore, it is possible to reduce the power consumption of the ink jet printer in the standby state.

(Fourth Embodiment)

Figure 7:
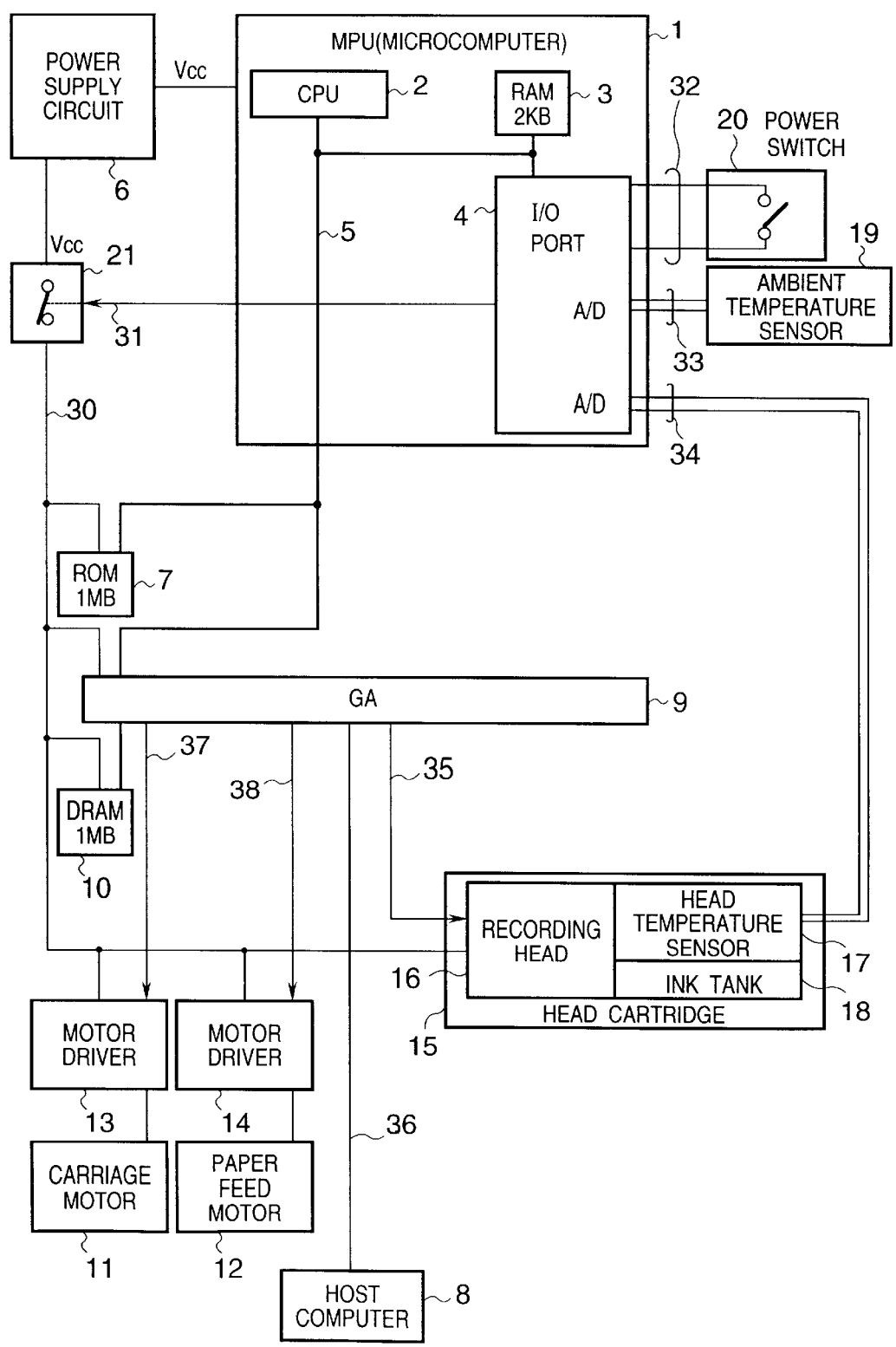
FIG. 7 is a block diagram of an electronic apparatus in the fourth embodiment of the present invention.

FIG. 7 is a block diagram of an electronic apparatus in the fourth embodiment of the present invention. In FIG. 7, the same reference numbers are used for the same items as those shown in the above embodiment, avoiding redundant description.

In the fourth embodiment, the normal opening switch 21 in the first embodiment is changed to a normal closing one. Consequently, although the power is supplied only to the MPU 1 from the power supply circuit until the switch signal 31 is output in the first embodiment, the power is supplied to the whole printer in this fourth embodiment. Therefore, the CPU 2 can operate just after the power supply is turned on according to the control program stored in the ROM 7. Consequently, the ROM 2a of the CPU 2 described in FIGS. 1, 4 and 5 is omissible.

Figure 8:
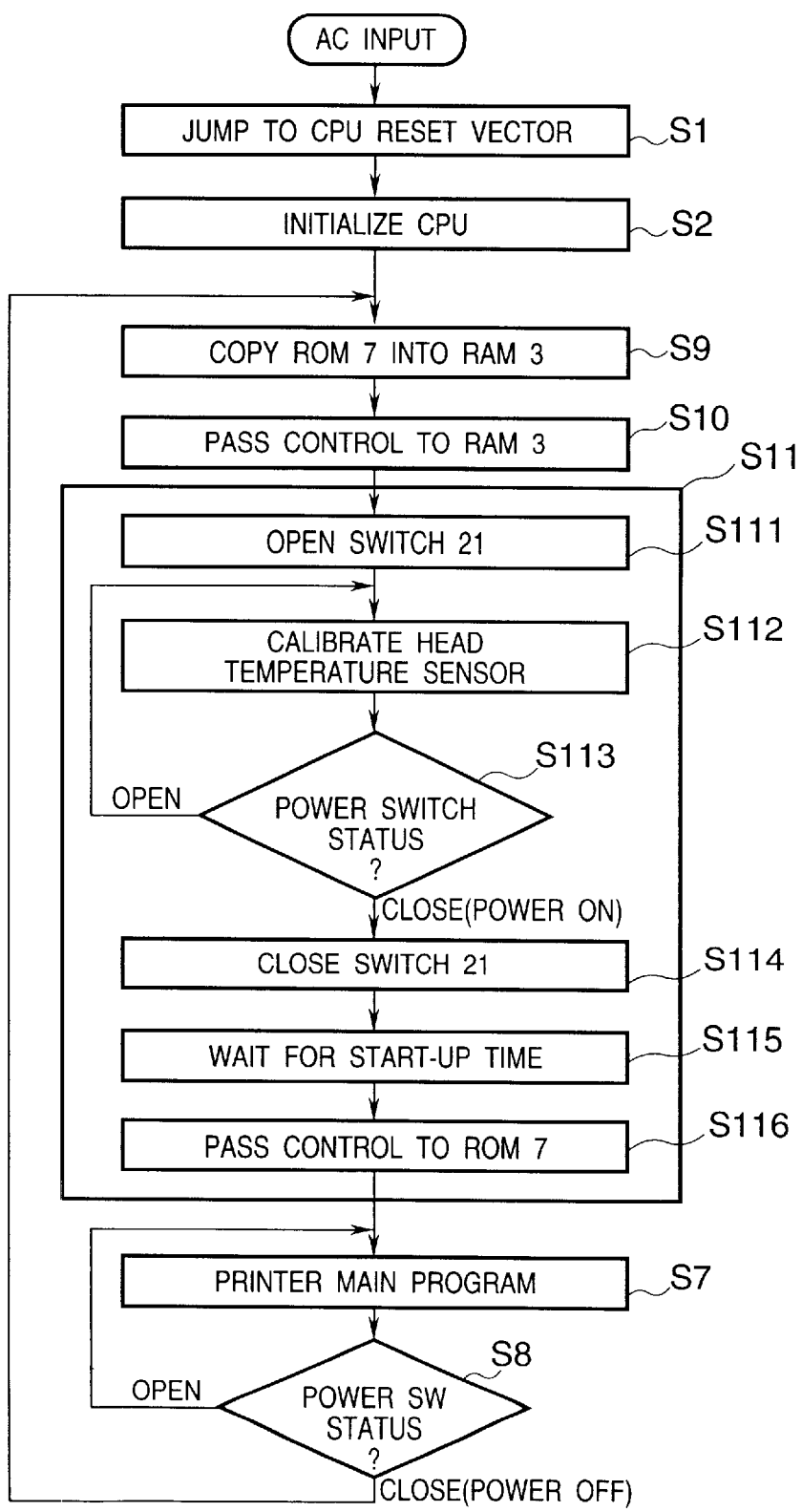
FIG. 8 is a flow chart for a processing sequence executed in the ink jet printer in the fourth embodiment of the present invention.

FIG. 8 shows a flowchart for such a processing sequence executed in the ink jet printer. In FIG. 8, the same reference numbers are used for the same processing steps as those in the above embodiment, avoiding redundant description. As to be understood in the comparison between the flow charts shown in FIG. 8 and in the above embodiment, the control program stored in the ROM 7 is executed when the power is turned on in such a case shown in FIG. 8, so the processings in steps S3 to S6 are omissible.

As described above, according to the first to fourth embodiments, therefore, it is possible to stop the power supply to all the devices except for the MPU and execute the minimum number of programs loaded in the RAM provided in the MPU, thereby minimizing the power consumption of such an electronic apparatus as a printer provided with an MPU having a CPU, a RAM, and an I/O port in itself, as well as a ROM, a GA, and an external RAM in the standby state. Consequently, unlike the case in which the power supply to the whole apparatus is shut off so as to stop the operation thereof, the operation can be restarted quickly, since it is no need to provide sequences for setting and obtaining operation parameters of the apparatus when it is started up.

In addition, it is also possible to reduce the power consumption of the apparatus more in the standby state. More concretely, the power can be saved more significantly when the apparatus stands by.

It is also possible to transfer the control program to be executed in the standby state from the memory to which the power supply is stopped to the RAM in the control unit, so that the power supply is controlled so as to supply the power only to the control unit while the apparatus is in the standby state.

Because a processing which should be executed in the steady state is executed in the standby state, it is also possible to suppress the power consumption and make good use of the standby time.

Because the frequency of the clock signal supplied to the control unit in the standby state is lowered, it is also possible to reduce the power consumption more significantly.

(Fifth Embodiment)

Figure 9:
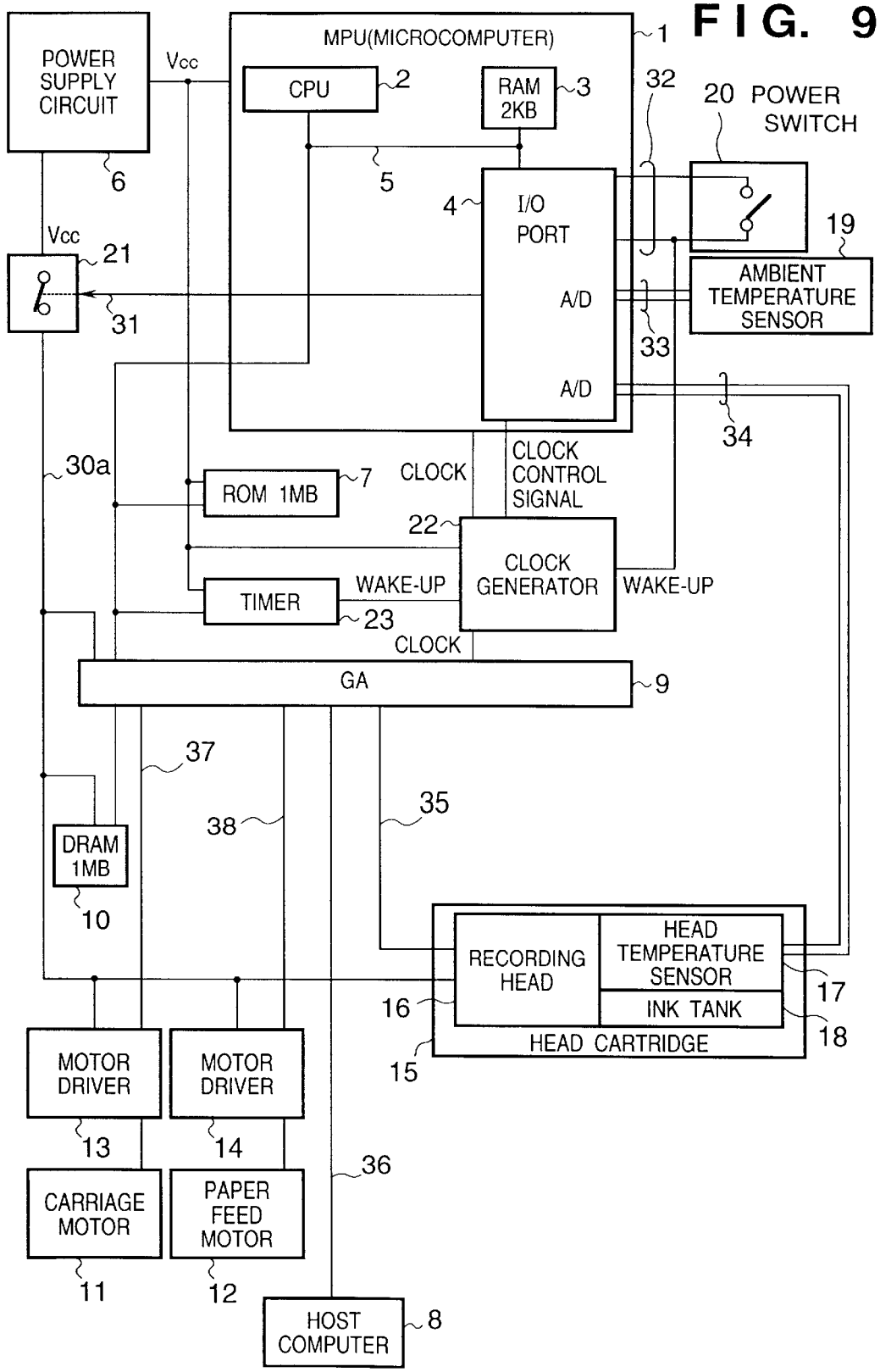
FIG. 9 is a block diagram of an electronic apparatus in the fifth embodiment of the present invention.

FIG. 9 is a block diagram of an electronic apparatus in the fifth embodiment of the present invention. In FIG. 9, the same reference numbers are used for the same items of the apparatus in the above embodiment, avoiding redundant description.

The power line 30 led out from the switch 21 is connected to the power input terminal of each of the GA 9, the DRAM 10, the carriage motor 11, the paper feeding motor 12, the motor drivers 13 and 14, and the recording head 16, so that a power is supplied to/shut off from each of those devices and elements.

A reference number 22 denotes a clock generator which supplies a clock to the MPU 1 and the GA 9. The clock generator 22 slows down and stops the clock when the apparatus is in the standby state so as to reduce the power consumption in the MPU 1. The I/O port 4 outputs a clock control signal for controlling the clock speed of the clock generator 22. If the clock slows down, the original clock speed can be restored with the clock control signal from the MPU 1. If the clock stops, however, the clock supply to the MPU 1 is also stopped. Thus, the MPU 1 stops and the clock supply cannot be restarted from the MPU 1.

This is why if the clock supply from the clock generator 22 is stopped, a wake-up signal is used to restart the clock supply. The clock generator 22 connected to the power switch 20 and the timer (TIMER) 23 thus receives the wake-up signal from both of the switch 20 and the timer 23.

If the power switch 20 is pressed, a wake-up signal is sent to the clock generator 22, thereby the MPU 1 is supplied with the clock again and restarted. And, the MPU, when it is restarted, reads the signal from the power switch via the I/O port 4 and detects that the power switch 20 is turned on.

The timer 23, connected to the CPU 2 via the bus 5, generates a wake-up signal with the time set by the CPU 2 to be transmitted to the clock generator 22. Because the timer 23 is operated independently of other devices, it has a clock circuit in itself. The clock generator 22 and the timer 23 are kept supplied with a power from the power supply circuit 6, since they are operated even when the clock supply to the MPU 1 is stopped. The ROM 7 is also kept supplied with a power from the power supply circuit 6, since it stores a program for controlling the CPU 2.

In the fifth embodiment, the head temperature sensor is calibrated while the apparatus is in the standby state and the power supply to the apparatus except for the MPU 1, the ROM 7, the clock generator 22, the timer 23, the head temperature sensor 17, and the ambient temperature sensor 19 is stopped by the power switch 20. At this time, the power switch 20 is monitored so as to restart the apparatus.

Next, processings executed in the ink jet printer in the fifth embodiment will be described with reference to the flow chart shown in FIG. 10.

Figure 10:
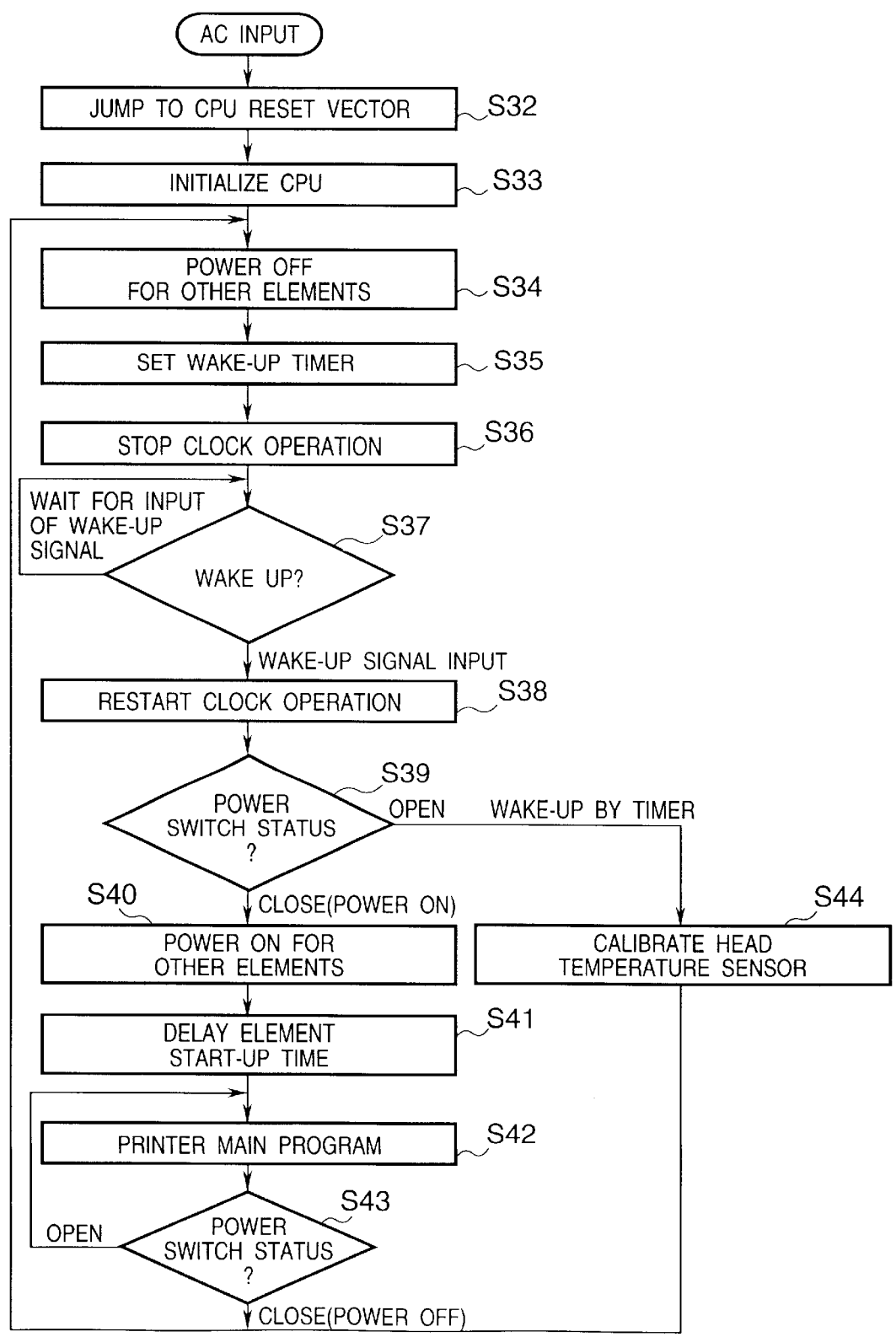
FIG. 10 is a flow chart for a processing sequence executed in the ink jet printer in the fifth embodiment of the present invention.

FIG. 10 is a flow chart for those processings executed in the ink jet printer in the fifth embodiment of the present invention.

At first, if the AC plug connected to the power supply circuit 6 is connected to a commercial AC outlet and the AC_in signal is detected, the following processing is started. The AC_in signal indicates that AC input supply to the power supply circuit 6 is started.

At first, the CPU 2 is reset by the power-on signal when AC supply to the power supply circuit 6 is started in step S32. The system control then jumps (JMP) to the reset vector. In step S33, the CPU 2 sets the I/O port 4 and initializes the necessary devices including the RAM 3. In step S34, the power control switch 21 is pressed to turn off the power supply to other devices. After this, a wake-up signal generating time is set for the timer 23 in step S35.

The CPU 2 outputs the clock stop signal to the clock generator 22 via the I/O port 4 in step S36 so as to stop the clock supply to the MPU 1 from the clock generator 22. The CPU 2 waits for an input of the wake-up signal to the clock generator 22 in step S37. If the power switch 20 is pressed or the clock generator 22 receives the wake-up signal from the timer 23 that has come into a time-out state, the system control goes to step S38.

In step S38, the clock supply from the clock generator 22 to the MPU 1 is restarted, thereby the operation of the CPU 2 is restarted. Then, it is decided whether or not the power switch 20 is pressed in step S39. If the switch 20 is not pressed, the system control goes to step S44 so that the head temperature sensor 17 of the recording head 16 is calibrated. If the power switch 20 is not pressed when the apparatus is woken up, the wake-up is decided to have been made by the timer 23. Because the head temperature sensor 17 and the ambient temperature sensor 19 are supplied with a power and the sensor outputs are connected to the I/O port 4 directly without passing other devices such as the GA 9, the calibration of the head temperature sensor 17 is possible without restarting the power supply and the clock supply to other devices. After the calibration ends, the system control returns to step S34.

On the other hand, if the power switch 20 is pressed in step S39, the system control goes to step S40, where the power control switch 21 is pressed to turn on the power to other devices. In step S41, a delay is set for starting up the devices which are not enabled immediately in step S40. In step S42, the CPU 2 receives recording data from the host computer 8 according to the main program stored in the ROM 7, thereby controlling the motors and the recording operation, etc.

While this main program is executed, it is decided whether or not the power switch 20 is pressed in step S43. If the switch 20 is not pressed, the main program in step S42 is looped so as to be executed continuously. If the switch 20 is pressed, the system control returns to step S34 to turn off the power (standby state).

As described above, according to the fifth embodiment, when the apparatus is in the standby state, the power supply is stopped for devices except the MPU 1 and a device required to operate the MPU 1 and the clock supply to the MPU 1 is stopped. On the other hand, when the apparatus operation is restarted, the clock supply to the MPU 1 is restarted and the power supply to the devices except for the MPU 1 and the device required for operating the MPU 1 is restarted, thereby suppressing the energy consumption in the standby state, and further suppressing the energy consumption of the whole electronic apparatus.

In addition, unlike the case in which the power supply to the whole apparatus is shut off to stop the operation, the operation can be restarted quickly without executing the sequences for setting and obtaining the operation parameters of the apparatus.

Because the timer 23 is used for restarting the clock supply after it is stopped once, it is possible to operate the MPU 1 with an intermittent supply of the clock in the standby state, so that the MPU 1 can do maintenance works including a calibration, etc.

(Sixth Embodiment)

Although the printer in the fifth embodiment is provided with only one recording head 16, the present invention can also apply to such a printer as a multi-color printer provided with a plurality of recording heads. Hereunder, such a multi-color printer will be described as the sixth embodiment of the present invention.

Figure 11:
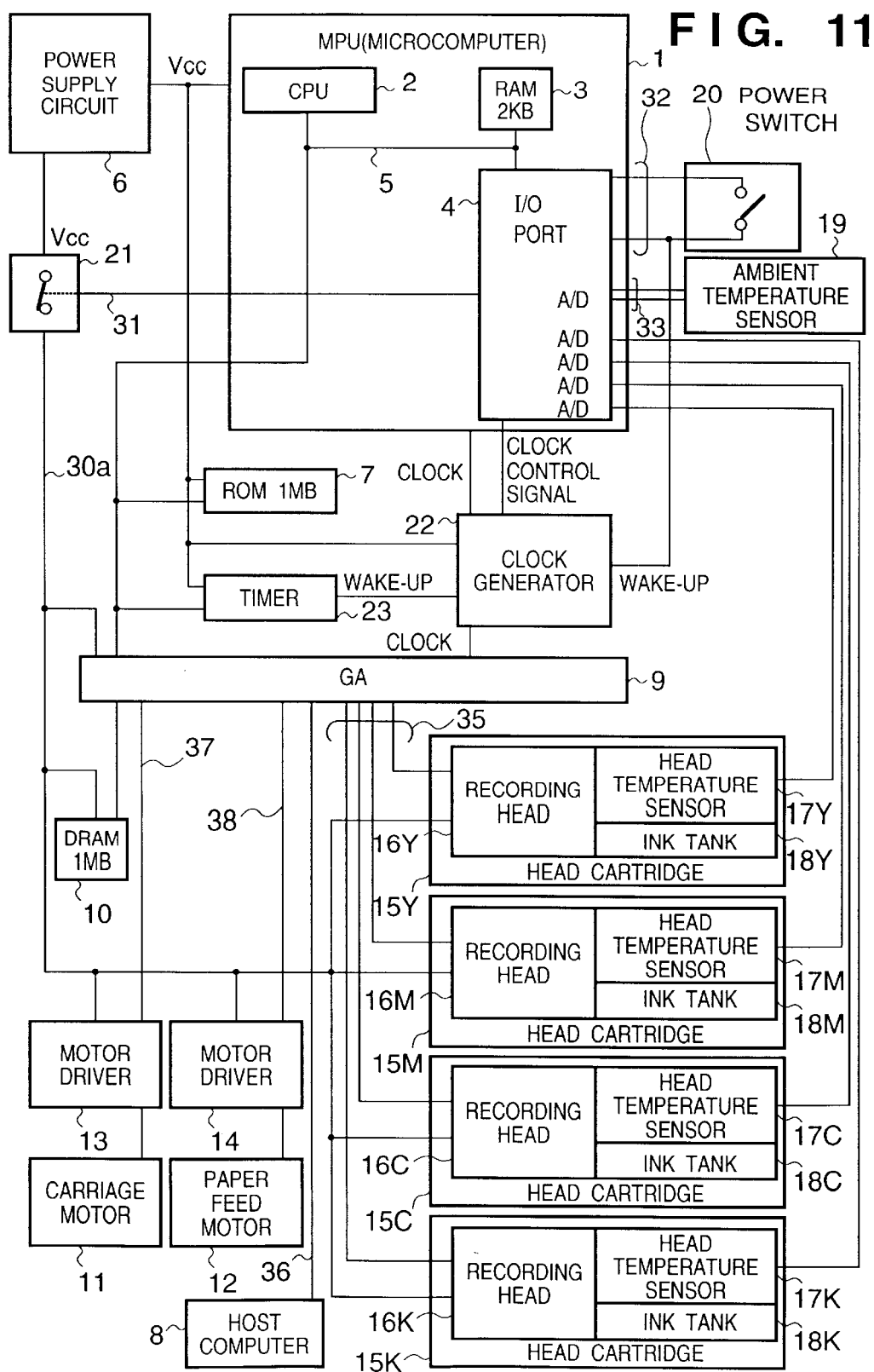
FIG. 11 is a block diagram of an electronic apparatus in the sixth embodiment of the present invention.

FIG. 11 is a block diagram of an electronic apparatus in the sixth embodiment of the present invention. The configuration of the apparatus shown in FIG. 11 differs from the configuration shown in FIG. 9 only in that the recording head 16 is replaced with a plurality of recording heads (16Y for yellow, 16M for magenta, 16C for cyan, and 16K for black).

The temperature of each recording head is detected by the corresponding head temperature sensor (17Y, 17M, 17C, 17K). The signal from each of those sensors is entered to the CPU 2 via the I/O port 4. Consequently, just like in the fifth embodiment described above, the CPU 2 obtains the signals from those head temperature sensors 17Y, 17M, 17C, and 17K sequentially via the I/O port 4, then compares the signal with the ambient temperature signal obtained from the ambient temperature sensor 19, thereby calibrating each of the sensors 17Y to 17K.

(Seventh Embodiment)

In the seventh embodiment, the clock generator 22 is attached to the MPU 1 and the timer 23 is attached to the GA 9 provided respectively in the fifth embodiment.

Figure 12:
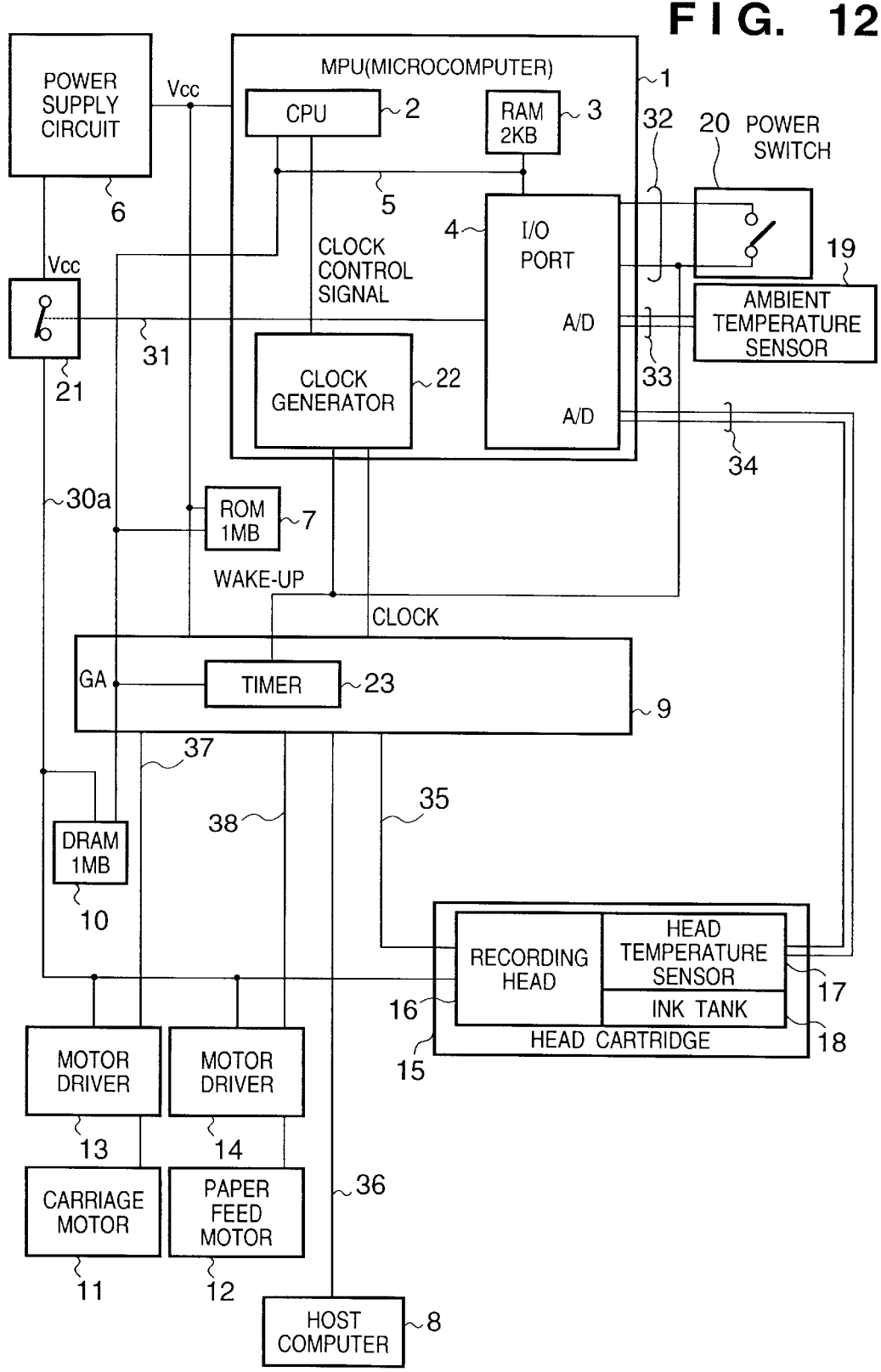
FIG. 12 is a block diagram of an electronic apparatus in the seventh embodiment of the present invention.

FIG. 12 is a block diagram of an electronic apparatus in the seventh embodiment of the present invention.

In FIG. 12, the GA 9 is kept supplied with a power. Although the clock generator 22 is composed independently of the MPU 1 and the timer 23 is composed independently of the GA 9 respectively in the fifth embodiment, their compositions are as shown in FIG. 12 in this embodiment, thereby the cost of the apparatus can be reduced. In this case, the clock generator 22 is just built in the MPU 1. The timer 23 has its own clock circuit in itself so that it can operate even when the clock supply from the clock generator 22 to the GA 9 is stopped. In addition, the GA 9 in this embodiment is modified so as to be kept supplied with a power and operate the timer 23, the clock supply is stopped when the apparatus is in the standby state. Consequently, the power consumption in the GA 9 is confined only to the power consumption in the timer 23 and slight static power consumption in other devices.

As described above, according to the seventh embodiment, therefore, it is possible to obtain the same effect as that in the fifth embodiment at a lower cost.

(Eighth Embodiment)

The eighth embodiment is a variation of the processing sequence executed in the fifth embodiment. Hereunder, the processing sequence to be executed in the ink jet printer in the first embodiment will be described with reference to the flow chart shown in FIG. 13.

Figure 13:
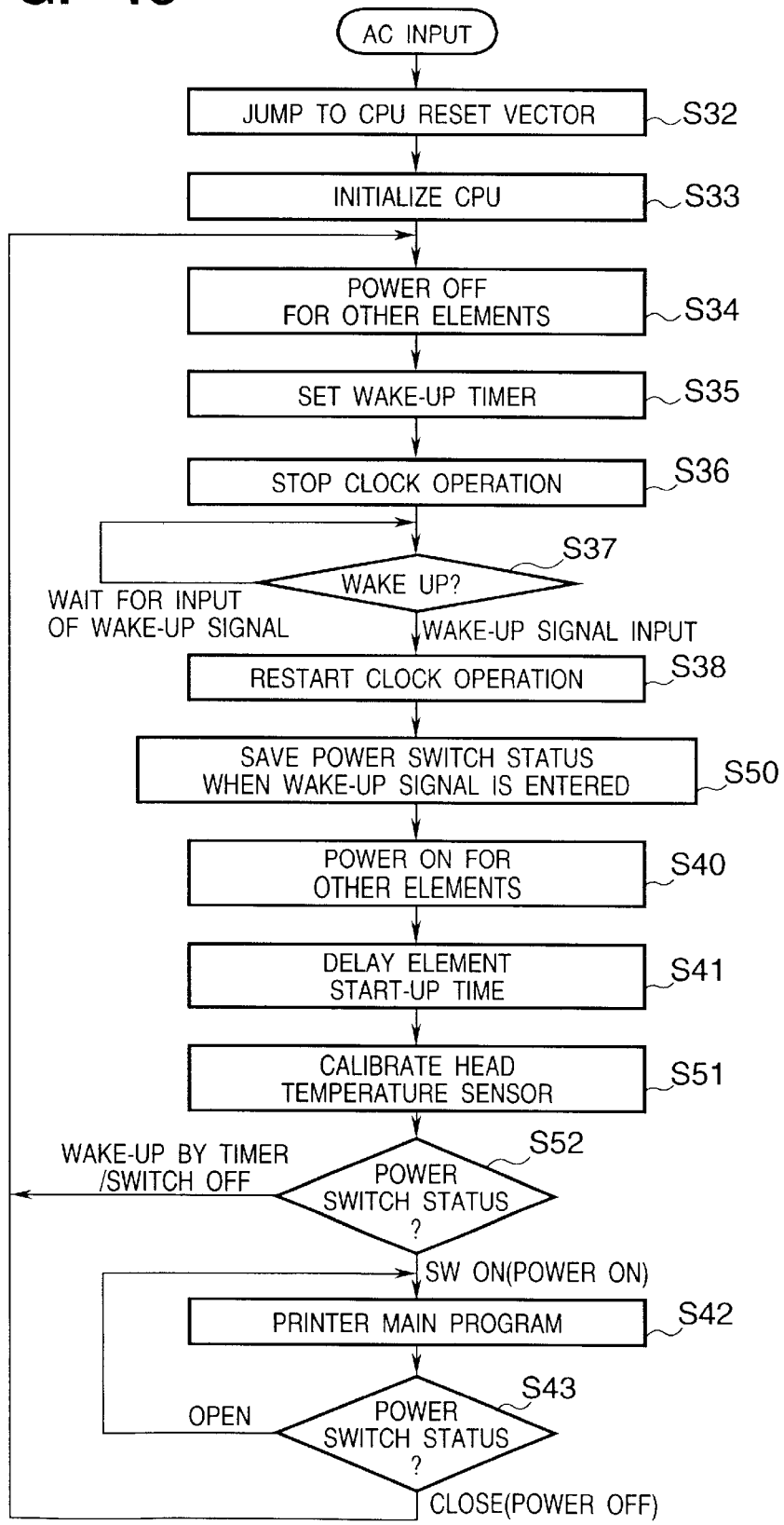
FIG. 13 is a flow chart for a processing sequence executed in the eighth embodiment of the present invention.

FIG. 13 is a flow chart of the processing sequence executed in the eighth embodiment of the present invention.

In FIG. 13, the same step numbers are used for the same processings as those shown in FIG. 10. In addition, the steps S39 and S44 in FIG. 10 are removed in FIG. 13. Instead, steps S50 to S52 are added.

In FIG. 10, a wakeup signal is entered in step S37, then the clock operation is restarted in step S38, so that the start-up factor is decided in step S39. This is why the power switch 20 is monitored to decide if the wakeup signal is issued by the power switch 20 or by the timer 23.

On the other hand, in FIG. 13, the clock is restarted in step S38, then the status of the power switch 20 is stored in the RAM 3 in step S50 when the wakeup signal is entered. Then, the system control goes to step S40, where the power to other devices is turned on regardless of the start-up factor. In step S41, a delay is set for the start-up time of each of other devices. After that, the head temperature sensor 17 is calibrated in step S51.

In step S52, the status of the power switch 20 stored in step S50 is read when the wakeup signal is entered, thereby deciding if the power switch 20 is pressed or not. If the switch 20 is not pressed, it is decided that the wakeup signal is issued by the timer 23 and the system control returns to step S34. If the switch 20 is pressed, it is decided that the wakeup signal is issued by the power switch and the system control goes to step S42, where the power to the apparatus is turned on.

Unlike the case shown by the flow chart in FIG. 10, the wakeup signal issued by the timer 23 in FIG. 10 enables the calibration of the head temperature sensor 17 while the power to other devices is turned off. Therefore, the calibration requires no power supply to unnecessary devices, thus surplus power consumption can be avoided.

On the contrary, in the case shown in FIG. 13, power supply is also needed for unnecessary other devices even when the wakeup signal is issued by the timer 23. Thus, the power consumption is increased according to the calibration time more than the case shown in FIG. 10. In spite of this, the case shown in FIG. 13 still has an advantage that the functions of those other devices can be used during the calibration.

Figure 14:
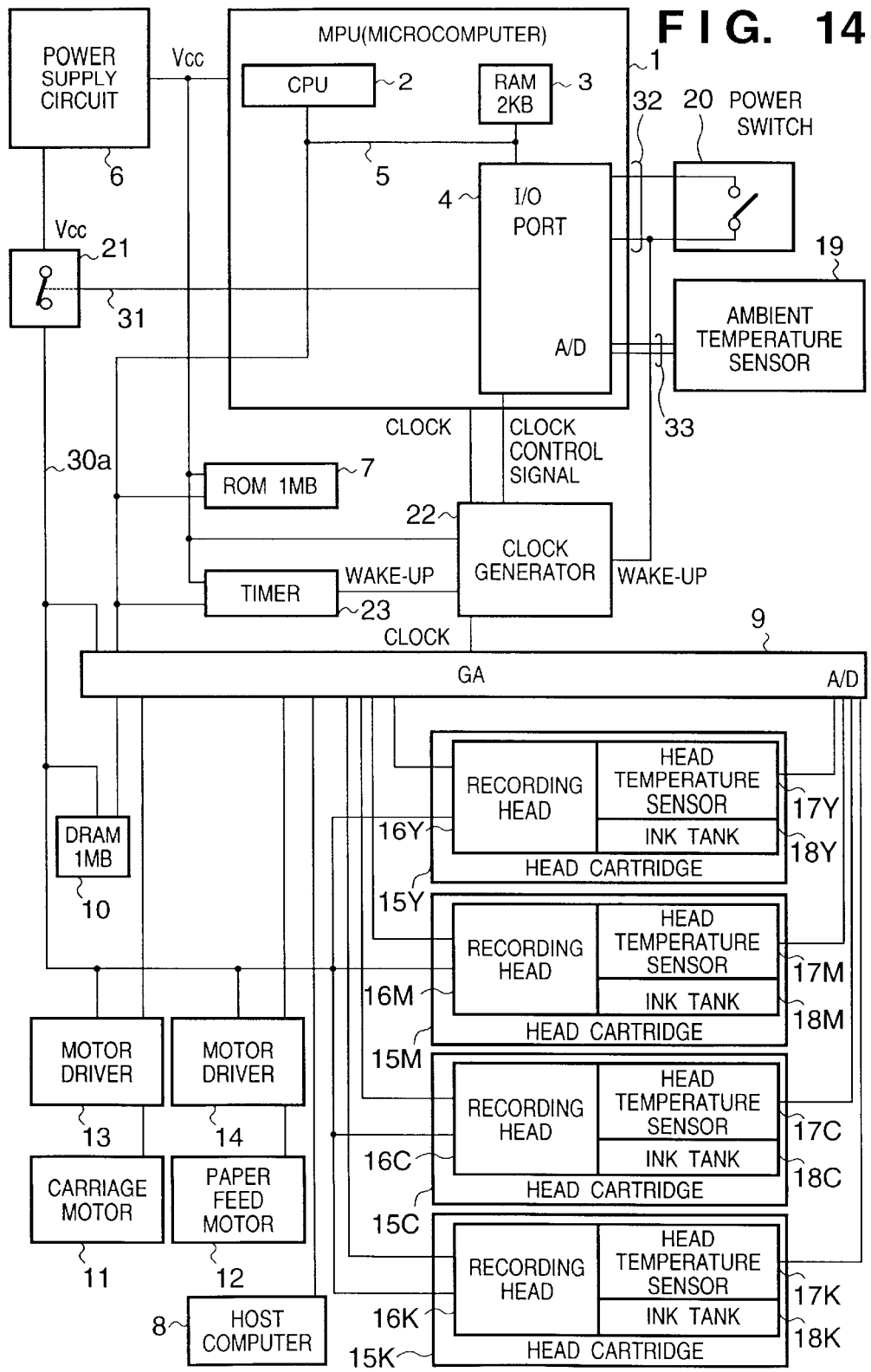
FIG. 14 is a block diagram of an electronic apparatus in the eighth embodiment of the present invention.
Figure 15:
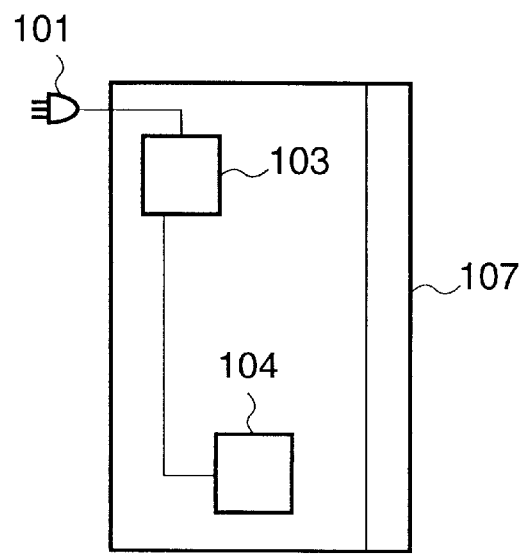
FIG. 15 is a block diagram of a power supply unit for an electronic apparatus, from which the conventional power switch is removed.
Figure 16:
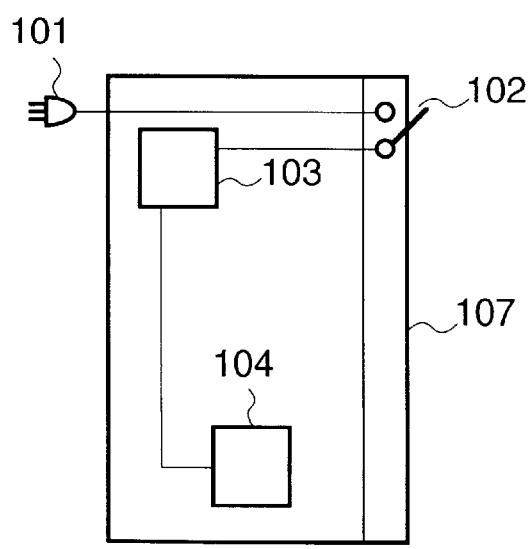
FIG. 16 is a block diagram of a power supply unit for an electronic apparatus in the conventional configuration shown in FIG. 15 in which a power switch 102 is added.
Figure 17:
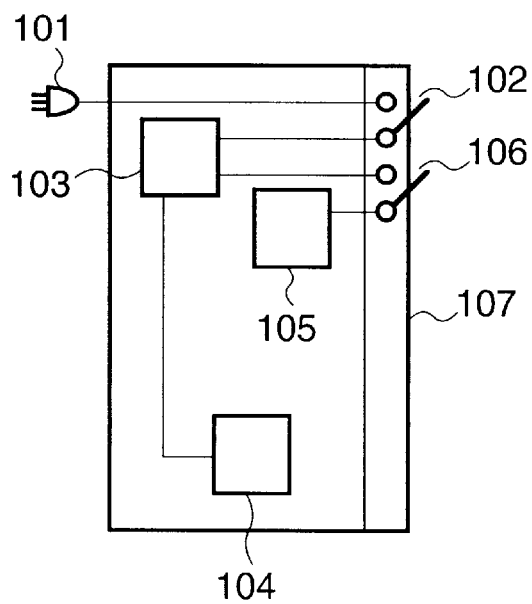
FIG. 17 is a block diagram of a power supply unit for an electronic apparatus in the conventional configuration shown in FIG. 16 in which a sub-power switch 106 is used together with the main power switch 102, and the control circuit 104 is divided into two circuits 104 and 105.
Figure 18:
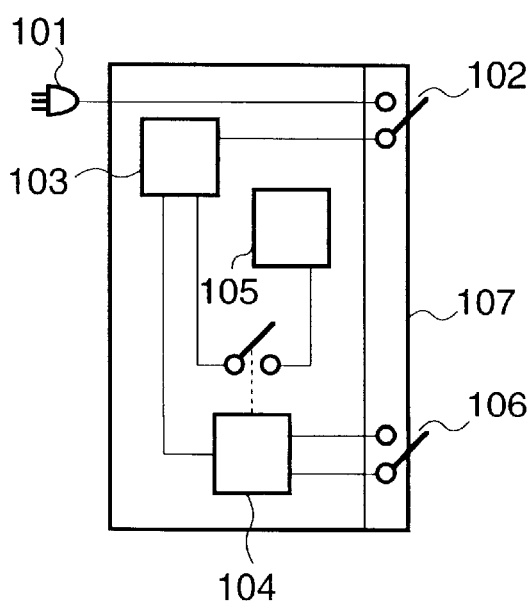
FIG. 18 is a block diagram of a power supply unit for an electronic apparatus, which controls power supplied from the control circuit 104 to the control unit 105, although no power supply is controlled between two control circuits in FIG. 17 which shows the conventional power supply unit. The control circuit 104 in FIG. 20 is supplied with power nonstop.
Figure 19:
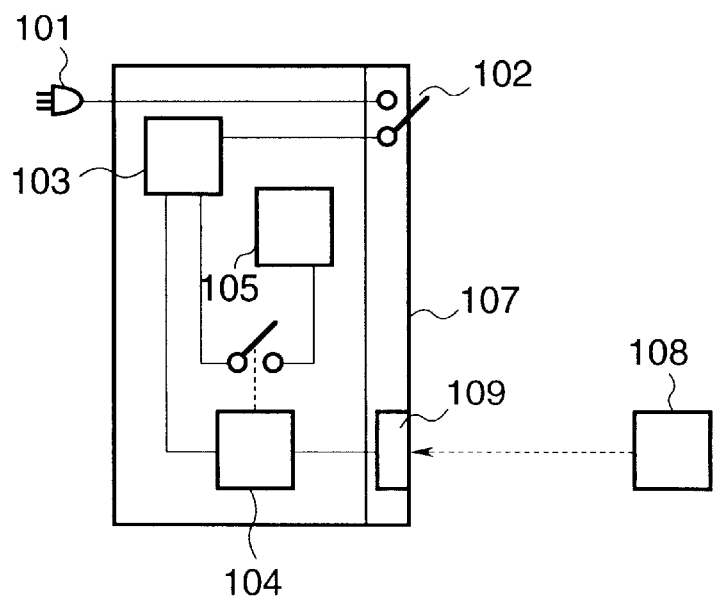
FIG. 19 is a block diagram of a power supply unit for an electronic apparatus, in which the conventional control signal input circuit switch 106 shown in FIG. 18 is replaced with an infrared beam signal input circuit.
Figure 20:
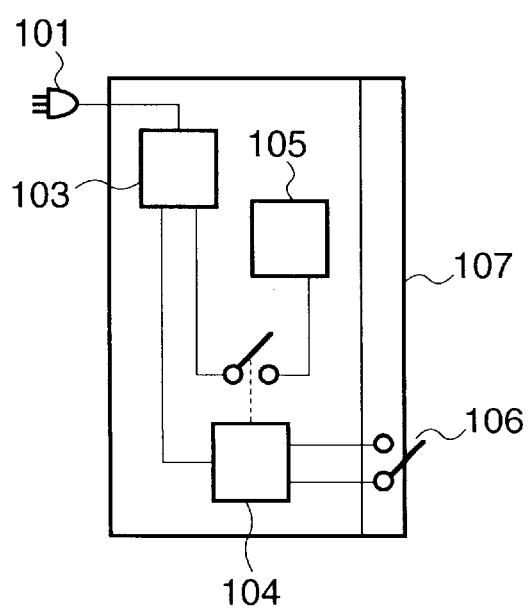
FIG. 20 is a block diagram of a power supply unit for an electronic apparatus in the conventional configuration shown in FIG. 18 from which the main power switch 102 is removed.
Figure 21:
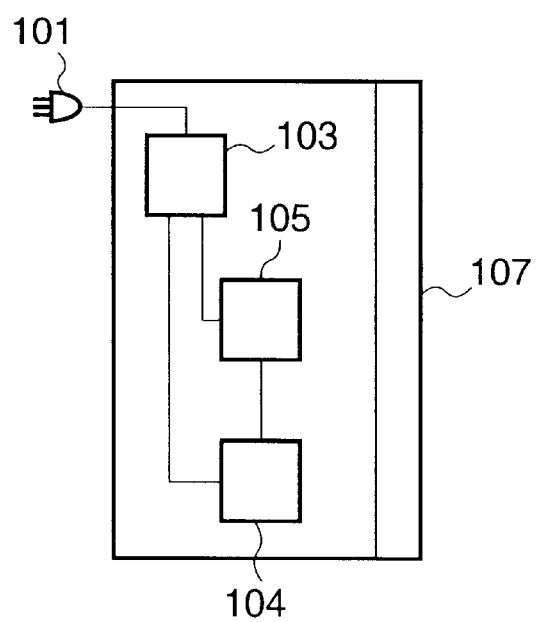
FIG. 21 is a block diagram of a power supply unit for an electronic apparatus, which stops the operation and reduces the power consumption of the electronic apparatus according to a stop signal transmitted from the control circuit 104 and received by the control circuit 105 in the conventional configuration shown in FIG. 19. The apparatus is not provided with any power switch and the control circuit 104 is kept supplied with a power in this case.
Figure 22:
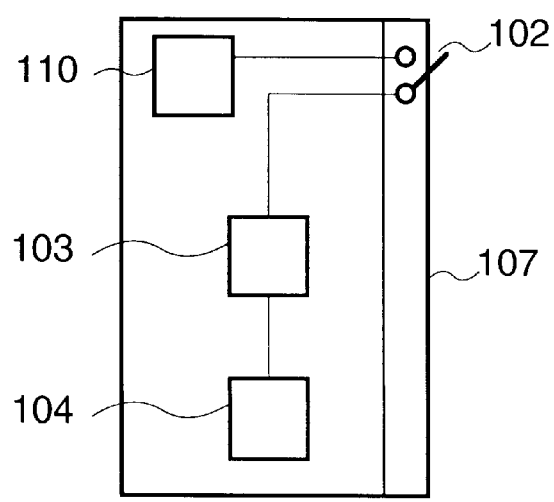
FIG. 22 is a block diagram of a power supply unit for an electronic apparatus in the conventional configuration shown in FIG. 16 in which the AC input circuit is replaced with a battery.

FIG. 14 is a block diagram of an electronic apparatus modified partially from that shown in FIG. 11. The electronic apparatus is provided with a plurality of head temperature sensors 17 in this case.

The configuration of the electronic apparatus shown in FIG. 14 differs from that shown in FIG. 11 only in that the output of each head temperature sensor 17 is not connected to the I/O port 4, but connected to an A/D input provided in the GA 9.

If the electronic apparatus is provided with a plurality of head temperature sensors 17 just like that shown in FIG. 14, the number of input ports of the I/O port 4 will be in short for some types of MPU 1. In such a case, that is, if the head temperature sensors 17 cannot be connected directly to the I/O port 4, then A/D input ports are provided in the GA 9 so that the head temperature sensors 17 are connected to those A/D input ports, thereby eliminating the shortage of the ports in the I/O port 4.

In this case, the GA 9 does not function while a head temperature sensor 17 is calibrated in step S44 as shown by the flow chart in FIG. 10, since the GA 9 is not powered during the time. In the flowchart shown in FIG. 13, however, the GA 9 is kept powered during such a calibration, so the CPU 2 can fetch the output of each head temperature sensor 17 via the GA 9.

As described above, according to the eighth embodiment, therefore, it is possible to use other devices than the MPU 1 and a device needed to operate the MPU 1 in the electronic apparatus without losing the effect of the fifth embodiment.

Although the electronic apparatus in the first to eighth embodiments is an ink jet printer, the present invention is not limited only to that; for example, the present invention can also apply to a facsimile machine and a copying machine which include the above ink jet printer respectively. In addition to such a printer, the present invention can also apply to power driven electronic apparatuses such as host computers, digital cameras, scanners portable terminals or the like.

The ROM 7 may also be a RAM backed up by, for example, a battery.

Although the power switch is pressed to turn off the power to the electronic apparatus, thereby the apparatus is set in the standby state in the above embodiments, the present invention may also apply to other cases that the apparatus is set in the standby state automatically, for example, when no key switch is pressed for a predetermined time, when no recording command is received for a predetermined time, etc.

The present invention may also apply to a system comprising a plurality of devices (for example, a host computer, an interface, a reader, a printer, etc.) and an apparatus composed of only one item (for example, a copying machine, a facsimile machine, or the like).

The object of the present invention can also be achieved by supplying the medium which records the software program codes for realizing the functions in the above embodiments to a system or an apparatus and letting those program codes read by the system or a computer (or the CPU/MPU) of the apparatus from the medium.

In this case, the program codes read from the recording medium realizes the functions of the object embodiment and the recording medium storing the program codes comes to compose the present invention.

The recording medium for supplying the above program codes may be, for example, a floppy disk, a hard disk, an optical disk, an optical magnetic disk, a CD-ROM, a CD-R, a magnetic tape, a non-volatile memory card, a ROM, or the like.

The present invention also includes a case in which the functions of the embodiments described above are realized through some or the whole of the actual processings executed not only by a computer which reads and executes the program codes, but also by an OS (Operating System) running on a computer according to the directions of the program codes.

The present invention also includes a case in which the program codes read from the recording medium are written in a memory provided in a function extension board set in a computer or a function extension unit connected to the computer, then the function extension board or the CPU of the function extension unit executes some or the whole processings according to the directions of the program codes, thereby realizing the functions of the embodiments described above.

As many apparently widely different embodiments of the present invention can be made without departing from the spirit and scope thereof, it is to be understood that the invention is not limited to the specific embodiments thereof except as defined in the appended claims.

What is claimed is:

1. An electronic apparatus comprising:

a control unit having at least a CPU, a RAM, and an I/O port;

a memory for storing a control program executed by said CPU;

a power supply unit for supplying power to each device of said apparatus;

a switching circuit for turning on/off a power supplied from said power supply unit to devices other than said control unit;

transferring means for transferring the control program stored in said memory to said RAM according to a power-off direction;

power-off controlling means for controlling said switching circuit so as to turn off a power supplied to devices other than said control unit after the control program is transferred to said RAM by said transferring means;

clock signal supplying means for supplying a clock signal to said control unit; and frequency lowering means for lowering the frequency of the clock signal supplied by said clock supplying means after said power-off controlling means turns off the power supply to said memory, wherein said CPU executes the control program stored in said RAM while power supply to said control unit is maintained after said power-off controlling means turns off a power supplied to devices other than said control unit.

2. The electronic apparatus according to claim 1, wherein said power supply unit supplies a power received from a commercial power supply to said control unit nonstop.

3. The electronic apparatus according to claim 1, wherein the power-off direction is issued by a switch connected to said I/O port.

4. The electronic apparatus according to claim 1, wherein said electronic apparatus is a printer, wherein said electronic apparatus further comprises a temperature sensor connected to said I/O port, and wherein said CPU calibrates said temperature sensor while power supply to said control unit is maintained after said power-off controlling means turns off the power supply to said memory.

5. A method of controlling power supply to an electronic apparatus comprising (a) a control unit having at least a CPU, a RAM, and an I/O port, and (b) a memory for storing a control program executed by the CPU, said method comprising:

a transferring step of transferring the control program stored in the memory to the RAM according to a power-off direction;

a step of turning off the supply of a power supplied to devices other than the control unit from a power supply unit for supplying a power to devices of the electronic apparatus after the control program is transferred to the RAM in said transferring step; and a step of executing the control program stored in the RAM with the CPU while the power supply to the control unit is maintained after the power supply to devices other than the control unit is turned off, wherein the frequency of a clock signal supplied to the control unit is lowered in said step of executing the control program.

6. The method of controlling power supply to an electronic apparatus according to claim 5, wherein the power supply unit supplies a power received from a commercial power supply to the control unit nonstop.

7. The method of controlling power supply to an electronic apparatus according to claim 5, wherein the power-off direction is issued by a switch connected to the I/O port.

8. The method of controlling power supply to an electronic apparatus according to claim 5, wherein a temperature sensor connected to the I/O port is also calibrated in said step of executing the control program.

9. An electronic apparatus comprising:

a plurality of devices including a temperature sensor;

clock signal supplying means for supplying a clock signal for operating said plurality of devices;

a plurality of directing means for directing said clock signal supplying means to supply the clock signal respectively;

deciding means for deciding which of said plurality of directing means has issued a direction;

controlling means for controlling a calibration of a sensor among said plurality of devices on the basis of a decision by said deciding means; and power supply controlling means for controlling power supply to devices other than a device required for controlling said controlling means, wherein when a direction of a calibration of said temperature sensor is issued, said controlling means causes said power supply controlling means to start power supply to a device required for performing the calibration, and stops power supply to devices other than the device required for performing the calibration.

10. The electronic apparatus according to claim 9, wherein said controlling means stops power supply to devices other than a device required by said power supply controlling means to control said controlling means and stops a clock signal supplied from said clock signal supplying means to said controlling means when said electronic apparatus is to be set in a standby state.

11. The electronic apparatus according to claim 10, wherein said controlling means restarts power supply to devices other than said devices required by said power supply controlling means to control said controlling means and restarts the clock signal supplied from said clock signal supplying means to said controlling means when said electronic apparatus is to be restarted from the standby state.

12. The electronic apparatus according to claim 9, wherein said controlling means includes at least a CPU, a RAM, and an I/O port in itself, and wherein said controlling means uses said I/O port to monitor said sensor.

13. The electronic apparatus according to claim 9, wherein each of said plurality of directing means includes at least a timer and a power switch, and wherein said controlling means calibrates said sensor if it is decided by said deciding means that one of said plurality of directing means, which has issued the direction, is said timer.

14. A method of controlling power supply to an electronic apparatus comprising a plurality of devices, said method comprising:

a clock signal supplying step of supplying a clock signal for operating said plurality of devices including a temperature sensor;

a deciding step of deciding which of a plurality of directing means has issued a direction for supplying the clock signal in said clock signal supplying step;

a controlling step of controlling a calibration of a sensor among the plurality of devices on the basis of a decision in said deciding step; and a power supply controlling step of controlling power supply to devices other than a device required for a control unit which controls the operations of the plurality of devices, wherein when a direction of a calibration of the temperature sensor is issued, the power supply is controlled to start power supply to a device required for performing the calibration and to stop power supply to devices other than the device required for performing the calibration.

15. The method of controlling power supply to an electronic apparatus according to claim 14,
wherein power supply is stopped for devices other than a device required for controlling the control unit in said power supply controlling step and clock signal supply to the control unit in said clock signal supplying step is stopped when the electronic apparatus is to be set in a standby state.

16. The method of controlling power supply to an electronic apparatus according to claim 15,
wherein power supply is restarted for devices other than a device required for controlling the control unit in said power supply controlling step and clock signal supply to the control unit in said supplying step is restarted when the electronic apparatus is to be restarted from the standby state.

17. The method of controlling power supply to an electronic apparatus according to claim 14,
wherein the control unit includes at least a CPU, a RAM, and an I/O port in itself, and
wherein the control unit uses the I/O port to monitor the sensor.

18. The method for controlling power supply to an electronic apparatus according to claim 14,
wherein the plurality of directing means includes at least a timer and a power switch, and
wherein the control unit calibrates a sensor if it is decided in said deciding step that the timer has issued the direction.

19. A recording apparatus for recording images on the basis of recorded data, comprising:
clock signal supplying means for supplying a clock signal for operating a plurality of devices including a temperature sensor;
a plurality of directing means for directing said clock signal supplying means to supply said clock signal respectively;
deciding means for deciding which of said plurality of directing means has issued a direction;
controlling means for controlling a calibration of a sensor among said plurality of devices on the basis of a decision by said deciding means;
power supply controlling means for controlling power supply to devices other than a device required for controlling said controlling means; and
recording means for recording images on the basis of the recorded data,
wherein when a direction of a calibration of said temperature sensor is issued, said controlling means causes said power supply controlling means to start power supply to a device required for performing the calibration, and stops power supply to devices other than the device required for performing the calibration.

20. The recording apparatus according to claim 19,
wherein said controlling means stops power supply to devices other than a device required by said power supply controlling means to control said controlling means and stops a clock signal supplied from said clock signal supplying means to said controlling means when said recording apparatus is to be set in a standby state.

21. The recording apparatus according to claim 20,
wherein said controlling means restarts power supply to devices other than a device required by said power supply controlling means to control said controlling means and restarts the clock signal supplied from said clock signal supplying means to said controlling means when said recording apparatus is to be restarted from the standby state.

22. The recording apparatus of claim 19,
wherein said controlling means includes at least a CPU, a RAM, and an I/O port in itself, and
wherein said controlling means uses said I/O port to monitor said sensor.

23. The recording apparatus according to claim 19,
wherein each of said plurality of directing means includes at least a timer and a power switch; and
said controller calibrates a sensor if it is decided by said deciding means that said timer has issued the direction, said deciding means being one of said plurality of directing means.

24. A method of controlling power supply to a recording apparatus for recording images on the basis of recorded data, comprising:
a clock signal supplying step of supplying a clock signal for operating a plurality of devices including a temperature sensor;
a deciding step of deciding which of a plurality of directing means has issued a direction for supplying the clock signal in said clock signal supplying step;
a controlling step of controlling a calibration of a sensor among the plurality of devices on the basis of a result of a decision in said deciding step;
a power supply controlling step of controlling power supply to devices other than a device required for controlling a control unit for controlling operations of the plurality of devices; and
a recording step of recording images on the basis of the recorded data,
wherein when a direction of a calibration of the temperature sensor is issued, the power supply is controlled to start power supply to a device required for performing the calibration and to stop power supply to devices other than the device required for performing the calibration.

25. The method of controlling power supply to a recording apparatus according to claim 24,
wherein power supply to devices other than a device required for controlling the control unit in said power supply controlling step is stopped and clock signal supply to said control unit in said clock signal supplying step is stopped when the recording apparatus is to be set in a standby state.

26. The method of controlling power supply to a recording apparatus according to claim 25,
wherein power supply to devices other than a device required for controlling the control unit in said power supply controlling step is restarted and clock signal supply to said control unit in said clock signal supplying step is restarted when said recording apparatus is to be restarted from the standby state.

27. The method of controlling power supply to a recording apparatus according to claim 24,
wherein the control unit includes at least a CPU, a RAM, and an I/O port in itself, and
wherein the control unit uses the I/O port to monitor the sensor.

28. The method for controlling power supply to a recording apparatus according to claim 24,
   wherein the plurality of directing means includes at least a timer and a power switch and
   wherein the control unit calibrates the sensor if it is decided in said deciding step that the timer has issued the direction.

29. An electronic apparatus comprising:
   a control unit having at least a CPU, a RAM, and an I/O port;
   a memory for storing a control program executed by said CPU;
   a power supply unit for supplying power to each device of said apparatus;
   a switching circuit for turning on/off a power supplied from said power supply unit to devices other than a said control unit;
   transferring means for transferring the control program stored in said memory to said RAM according to a power-off direction;
   power-off controlling means for controlling said switching circuit so as to turn off a power supplied to devices other than said control unit after the control program is transferred to said RAM by said transferring means; and
   a temperature sensor connected to said I/O port,
   wherein said CPU calibrates said temperature sensor while power supply to said control unit is maintained after said power-off controlling means turns off the power supply to said memory,
   wherein said CPU executes the control program stored in said RAM while power supply to said control unit is maintained after said power-off controlling means turns off a power supplied to devices other than said control unit, and
   wherein said electronic apparatus is a printer.

30. A method of controlling power supply to an electronic apparatus comprising (a) a control unit having at least a CPU, a RAM, and an I/O port, and (b) a memory for storing a control program executed by the CPU, said method comprising;
   a transferring step of transferring the control program stored in the memory to the RAM according to a power-off direction;
   a step of turning off the supply of a power supplied to devices other than the control unit from a power supply unit for supplying a power to devices of the electronic apparatus after the control program is transferred to the RAM in the transferring step; and
   a step of executing the control program stored in the RAM with the CPU while the power supply to the control unit is maintained after the power supply to devices other than the control unit is turned off,
   wherein a temperature sensor connected to the I/O port is calibrated in said step of executing the control program.

* * * * *

UNITED STATES PATENT AND TRADEMARK OFFICE
CERTIFICATE OF CORRECTION

PATENT NO. : 6,708,279 B1
DATED : March 16, 2004
INVENTOR(S) : Shigeo Takenaka

It is certified that error appears in the above-identified patent and that said Letters Patent is hereby corrected as shown below:

Column 9,
Line 8, "Si,", should read -- S1, --.
Line 27, "S9 a", should read -- S9 --.

Column 20,
Line 19, "plurality" should read -- plurality of --.

Column 21,
Line 17, "a said" should read -- said --.

Column 22,
Line 13, "comprising;" should read -- comprising: --.

Signed and Sealed this

Twenty-second Day of March, 2005

JON W. DUDAS
*Director of the United States Patent and Trademark Office*